United States Patent
Otani et al.

(10) Patent No.: US 10,359,727 B2
(45) Date of Patent: Jul. 23, 2019

(54) IMAGE PROCESSING APPARATUS, IMAGE PROCESSING METHOD, AND STORAGE MEDIUM, THAT DETERMINE A TYPE OF EDGE PIXEL

(71) Applicant: CANON KABUSHIKI KAISHA, Tokyo (JP)

(72) Inventors: Ryosuke Otani, Tokyo (JP); Yoichi Takikawa, Kawasaki (JP); Hisashi Ishikawa, Urayasu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/903,722

(22) Filed: Feb. 23, 2018

(65) Prior Publication Data
US 2018/0253050 A1     Sep. 6, 2018

(30) Foreign Application Priority Data

Mar. 1, 2017   (JP) .................................. 2017-038707

(51) Int. Cl.
| | |
|---|---|
| *H04N 1/409* | (2006.01) |
| *G03G 15/00* | (2006.01) |
| *H04N 1/40* | (2006.01) |
| *H04N 1/387* | (2006.01) |
| *H04N 1/407* | (2006.01) |

(52) U.S. Cl.
CPC ......... *G03G 15/5058* (2013.01); *H04N 1/387* (2013.01); *H04N 1/40* (2013.01); *H04N 1/407* (2013.01); *H04N 1/4092* (2013.01); *G03G 15/5025* (2013.01); *G03G 2215/0429* (2013.01)

(58) Field of Classification Search
None
See application file for complete search history.

(56) References Cited

U.S. PATENT DOCUMENTS 7,889,395 B2 *   2/2011   Goto .................... H04N 1/2307
                                                              358/1.9
2018/0253050 A1 *  9/2018  Otani ................. G03G 15/5058

FOREIGN PATENT DOCUMENTS

JP           2006295624 A    10/2006

* cited by examiner

*Primary Examiner* — Paul F Payer
(74) *Attorney, Agent, or Firm* — Rossi, Kimms & McDowell LLP

(57) ABSTRACT

The image processing apparatus of the present invention includes: an edge determination unit configured to detect an edge pixel to which a white pixel and a black pixel are adjacent in a first direction in an image in which each pixel is represented as a white pixel or a black pixel; a first detection unit configured to detect a number of consecutive pixels up to the edge pixel in the first direction in the image; a second detection unit configured to detect a number of consecutive pixels whose number of consecutive pixels in the first direction is larger than a first threshold in a second direction perpendicular to the first direction in the image; and a type determination unit configured to determine a type of the edge pixel based on detection results by the first detection unit and detection results by the second detection unit.

20 Claims, 19 Drawing Sheets

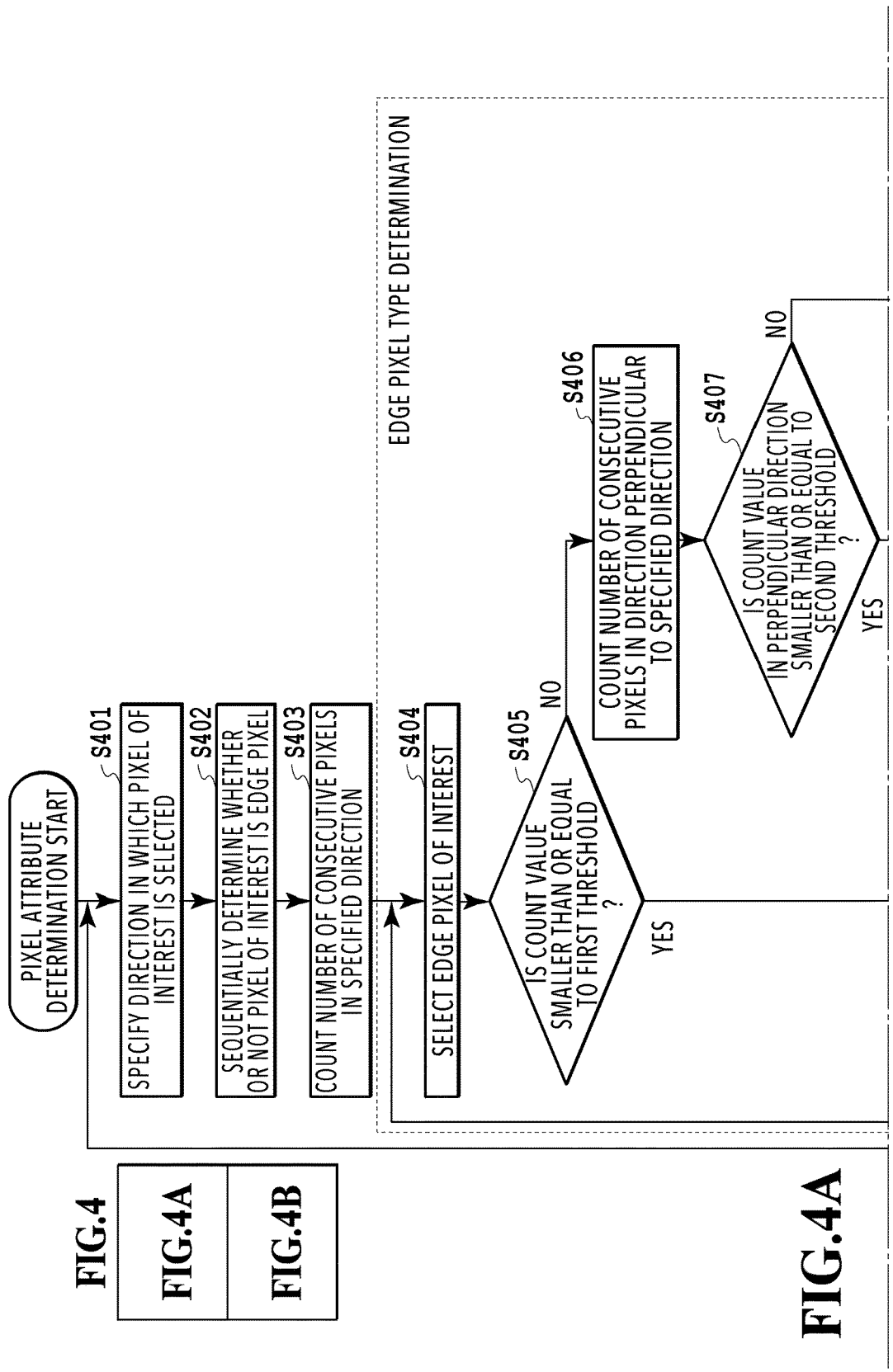

INPUT IMAGE DATA

|    | c1 | c2 | c3 | c4 | c5 | c6 | c7 | c8 |
|----|----|----|----|----|----|----|----|----|
| r1 | 2  | 2  | 2  | 0  | 0  | 2  | 2  | 2  |
| r2 | 2  | 2  | 2  | 0  | 0  | 2  | 2  | 2  |
| r3 | 2  | 2  | 2  | 0  | 0  | 2  | 2  | 2  |
| r4 | 2  | 2  | 0  | 0  | 0  | 2  | 2  | 2  |
| r5 | 2  | 0  | 0  | 0  | 0  | 2  | 2  | 2  |
| r6 | 2  | 2  | 2  | 0  | 0  | 2  | 2  | 2  |
| r7 | 2  | 2  | 2  | 0  | 0  | 2  | 2  | 2  |
| r8 | 2  | 2  | 2  | 0  | 0  | 2  | 2  | 2  |

PIXEL OF INTEREST
COMPARISON TARGET PIXEL

FIG.18B

LENGTH OF CONSECUTIVE PIXELS DATA

|    | c1 | c2 | c3 | c4 | c5 | c6 | c7 | c8 |
|----|----|----|----|----|----|----|----|----|
| r1 | 31 | 31 | 31 | 2  | 2  | 31 | 31 | 31 |
| r2 | 31 | 31 | 31 | 2  | 2  | 31 | 31 | 31 |
| r3 | 31 | 31 | 31 | 2  | 2  | 31 | 31 | 31 |
| r4 | 31 | 31 | 2  | 31 | 31 | 31 | 31 | 31 |
| r5 | 31 | 2  | 2  | 31 | 31 | 31 | 31 | 31 |
| r6 | 31 | 31 | 31 | 2  | 2  | 31 | 31 | 31 |
| r7 | 31 | 31 | 31 | 2  | 2  | 31 | 31 | 31 |
| r8 | 31 | 31 | 31 | 2  | 2  | 31 | 31 | 31 |

FIG.18C

EDGE PIXEL TYPE DETERMINATION RESULTS

|    | c1 | c2 | c3 | c4 | c5 | c6 | c7 | c8 |
|----|----|----|----|----|----|----|----|----|
| r1 | 0  | 0  | 1  | 2  | 2  | 1  | 0  | 0  |
| r2 | 0  | 0  | 1  | 2  | 2  | 1  | 0  | 0  |
| r3 | 1  | 1  | 1  | 2  | 2  | 1  | 1  | 0  |
| r4 | 2  | 2  | 2  | 0  | 2  | 1  | 1  | 0  |
| r5 | 2  | 2  | 2  | 0  | 2  | 1  | 1  | 0  |
| r6 | 1  | 1  | 1  | 2  | 2  | 1  | 1  | 0  |
| r7 | 0  | 0  | 1  | 2  | 2  | 1  | 0  | 0  |
| r8 | 0  | 0  | 1  | 2  | 2  | 1  | 0  | 0  |

IMAGE PROCESSING APPARATUS, IMAGE PROCESSING METHOD, AND STORAGE MEDIUM, THAT DETERMINE A TYPE OF EDGE PIXEL

BACKGROUND OF THE INVENTION

Field of the Invention

The present invention relates to an image processing apparatus capable of determining an edge type of an image, an image processing method, and a storage medium.

Description of the Related Art

For a recent printer or copy machine, an attempt is made to improve output image quality by performing various kinds of image processing for an edge portion where the shade changes rapidly in an input image. For example, in order to cancel a change in line width, which occurs resulting from a dot gain, it is known that line width correction processing to increase or reduce the line width of a character and a line (hereinafter, described as a "character line") is effective. Further, in order to suppress the influence of an edge effect in an electrophotographic printer, it is also known that density unevenness correction processing to adjust a gradation value in the vicinity of a solid edge portion is effective.

The image processing apparatus disclosed in Japanese Patent Laid-Open No. 2006-295624 identifies the edge type by using a pattern matching technique. In more detail, this image processing apparatus collates a local pixel block cut out from input image data with a plurality of pixel patterns stored in advance and identifies the edge type based on the collation results.

SUMMARY OF THE INVENTION

An object of the present invention is to provide an edge type determination technique that consumes a small amount of computer resource.

The image processing apparatus of the present invention includes: an edge determination unit configured to detect an edge pixel to which a white pixel and a black pixel are adjacent in a first direction in an image in which each pixel is represented as a white pixel or a black pixel; a first detection unit configured to detect a number of consecutive pixels up to the edge pixel in the first direction in the image; a second detection unit configured to detect a number of consecutive pixels whose number of consecutive pixels in the first direction is larger than a first threshold in a second direction perpendicular to the first direction in the image; and a type determination unit configured to determine a type of the edge pixel based on detection results by the first detection unit and detection results by the second detection unit.

Further features of the present invention will become apparent from the following description of exemplary embodiments with reference to the attached drawings.

BRIEF DESCRIPTION OF THE DRAWINGS

FIG. 4 is a diagram showing the relationship of FIG. 4A and FIG. 4B;

FIG. 4A and FIG. 4B are flowcharts showing a processing procedure of pixel attribute determination in the first embodiment;

FIG. 7A to FIG. 7C are schematic diagrams showing a specific example of edge pixel type determination in the first embodiment;

FIG. 8 is a schematic diagram showing a specific example of edge pixel type determination in the first embodiment;

FIG. 17 is a schematic diagram showing a specific example of length of consecutive pixels data in the third embodiment; and FIG. 18A to FIG. 18C are schematic diagrams showing a specific example of edge pixel type determination in the third embodiment.

DESCRIPTION OF THE EMBODIMENTS

In the case where the technique of pattern matching is used as in the image processing apparatus disclosed in Japanese Patent Laid-Open No. 2006-295624, there has been such a problem that the amount of consumed resource in the image processing apparatus becomes large. For example, there has been a case where the required memory capacity becomes extremely large because a large number of pixel patterns are stored. Alternatively, there has also been a case where the required amount of calculation becomes extremely large because the pixel configuration of an edge portion is identified with a high accuracy, and therefore, the size of a local pixel block becomes large.

In the following, embodiments for embodying the present invention are explained with reference to the drawings. However, the components described in the embodiments are merely exemplary and not necessarily intended to limit the scope of the present invention to those.

[First Embodiment]

(Hardware Configuration)

Figure 1:
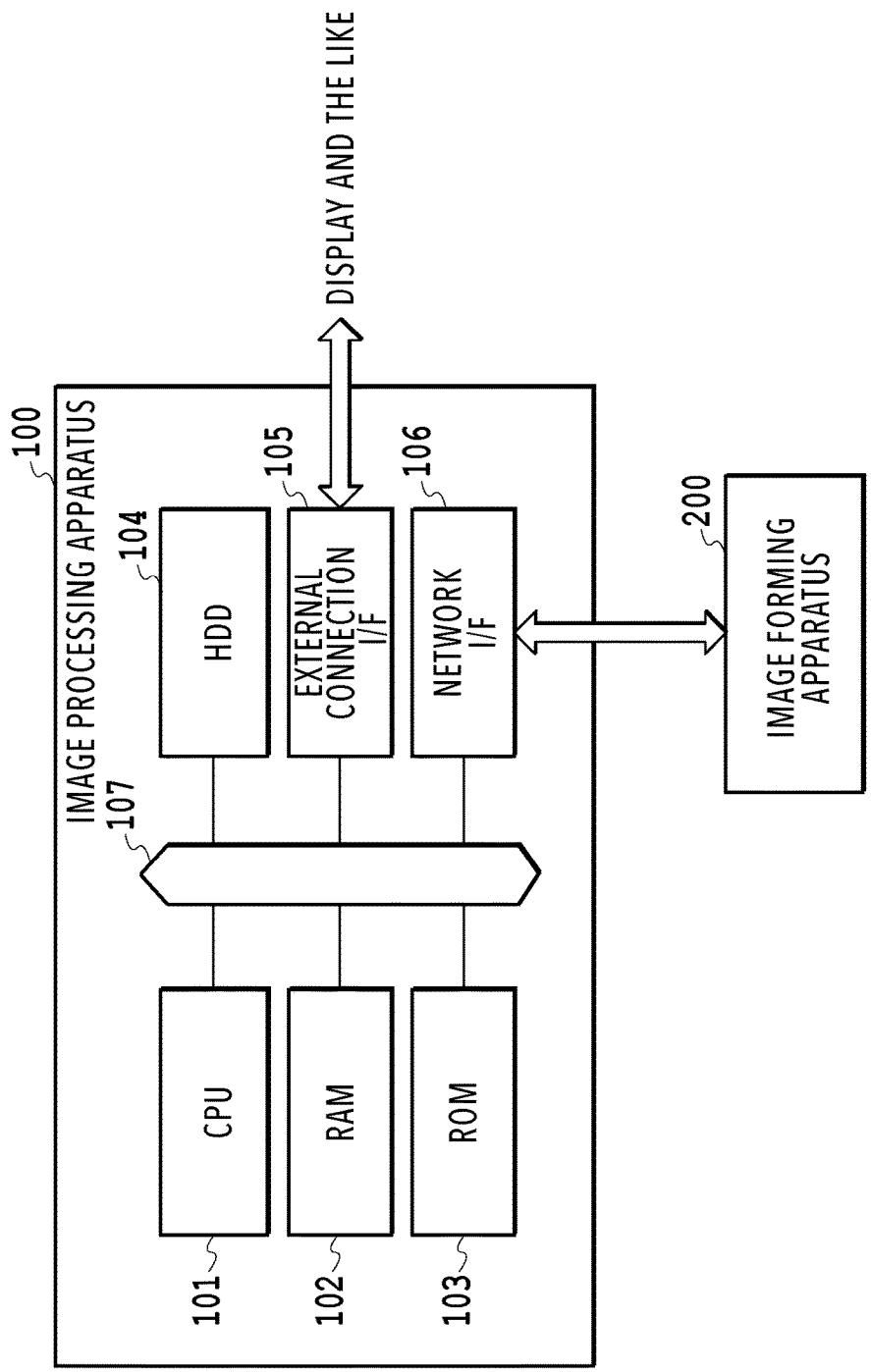
FIG. 1 is a hardware configuration diagram of an image processing apparatus in a first embodiment.

FIG. 1 is a block diagram showing a hardware configuration of an image processing apparatus 100 in the present embodiment. The image processing apparatus 100 is made up by including a CPU 101, a RAM 102, a ROM 103, an HDD (Hard Disk Drive) 104, an external connection interface (hereinafter, interface is described as "I/F") 105, and a network I/F 106. Further, each constituent is connected so as to be capable of communication via a bus 107. The CPU 101 includes an operation circuit and centralizedly controls the image processing apparatus 100. The CPU 101 reads programs stored in the ROM 103 or the HDD 104 onto the RAM 102 and performs various kinds of processing. The ROM 103 stores a system program or the like that is used to control the image processing apparatus 100. The HDD 104 has a function as a storage area and stores image data that is the target of processing, application programs to perform various kinds of processing, and so on. The HDD 104 is an example of a storage device and may include an SSD (Solid State Drive) and the like other than the HDD. The external connection I/F 105 is an interface to connect various devices to the image processing apparatus 100. For example, it is possible to connect a display, a keyboard, a mouse, and so on, via the external connection I/F 105. The network OF 106 controls input/output of data to and from an image forming apparatus 200 based on the control of the CPU 101. The image processing apparatus 100 transmits a print job to the image forming apparatus 200 (printer, copy machine, and so on). In FIG. 1, a hardware configuration example is shown in which the image forming apparatus 200 is connected outside the image processing apparatus 100 so as to be capable of communication, but it may also be possible to include a printing mechanism inside the image processing apparatus 100 as in a digital copy machine.

(Software Function Configuration)

Figure 2:
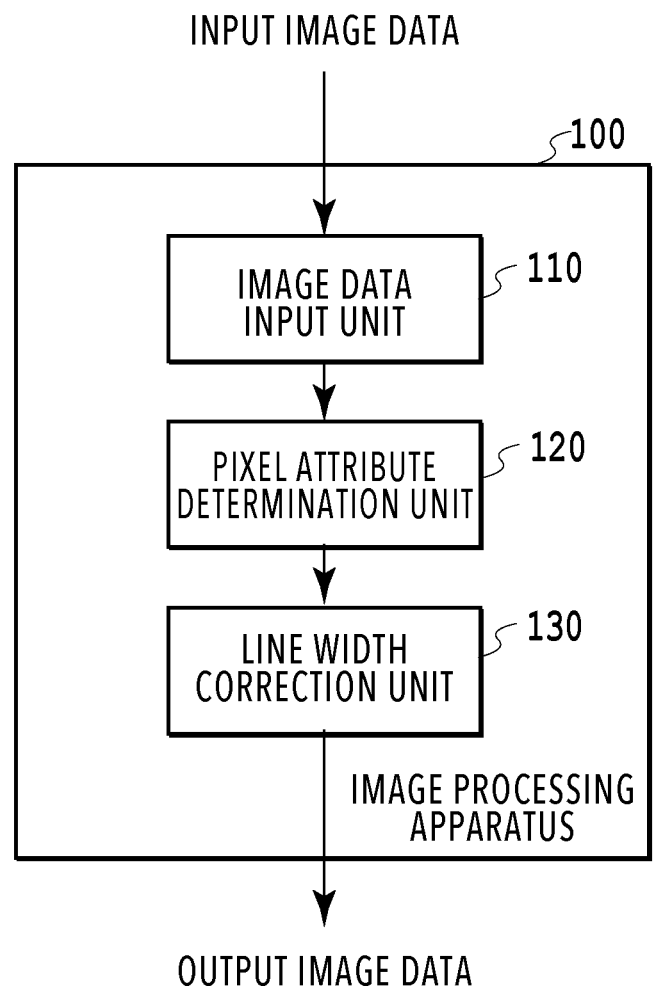
FIG. 2 is a software function configuration diagram of the image processing apparatus in the first embodiment.

FIG. 2 is a block diagram showing a software function configuration of the image processing apparatus 100 in the present embodiment. The functions of the block in FIG. 2 are implemented by the CPU 101 reading program codes stored in the ROM 103 onto the RAM 102 and executing the program codes. Alternatively, it may also be possible to mount hardware, such as an ASIC and an electronic circuit, to implement the functions of part or all of the block in FIG. 2. This is the same with block diagrams showing a software function configuration in the drawings that follow FIG. 2.

The image processing apparatus 100 of the present embodiment has an image data input unit 110, a pixel attribute determination unit 120, and a line width correction unit 130. The image data input unit 110 receives an input of image data received from an external device, not shown schematically. The input image data of the present embodiment is multivalued image data represented by, for example, gradation values of 0 to 2. The pixel attribute determination unit 120 classifies pixels making up input image data into edge pixels and non-edge pixels and further classifies edge pixels into character line edge pixels and solid edge pixels. The character line edge pixel is an edge pixel adjacent to a character line. The solid edge pixel is an edge pixel adjacent to a solid area. A specific processing procedure by the pixel attribute determination unit 120 is described later with reference to FIG. 4A and FIG. 4B. The line width correction unit 130 adjusts the gradation value of an edge pixel in the case where the edge pixel is determined to be a character line edge pixel.

Figure 3:
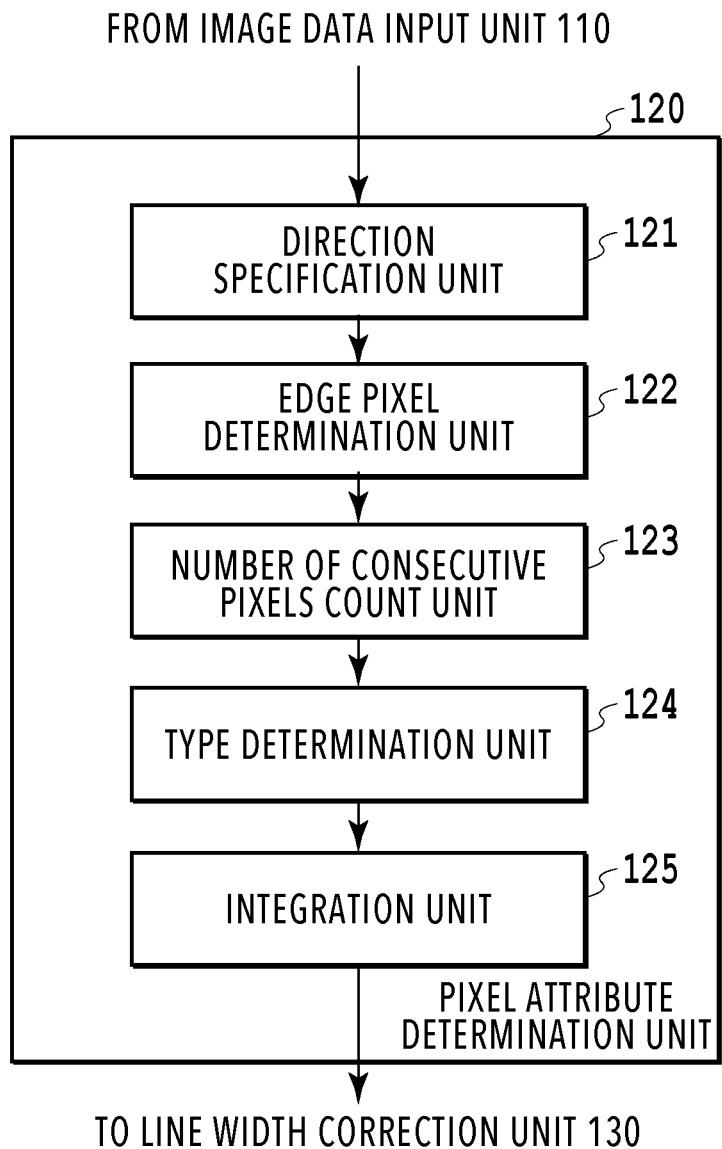
FIG. 3 is a software function configuration diagram of a pixel attribute determination unit in the first embodiment.

FIG. 3 is a block diagram showing a software function configuration of the pixel attribute determination unit 120 in the present embodiment. The pixel attribute determination unit 120 of the present embodiment has a direction specification unit 121, an edge pixel determination unit 122, a number of consecutive pixels count unit 123, a type determination unit 124, and an integration unit 125. The direction specification unit 121 specifies a direction in which a pixel of interest is selected. The edge pixel determination unit 122 determines whether or not the pixel of interest is an edge pixel while sequentially selecting the pixel of interest in the specified direction. The number of consecutive pixels count unit 123 counts the number of consecutive pixels in a predetermined pixel area in the specified direction. The type determination unit 124 determines the type of an edge pixel of interest. The integration unit 125 integrates individual determination results in the case where the determination results of the edge pixel type are different for different specified directions.

(Pixel Attribute Determination)

Figure 4B:
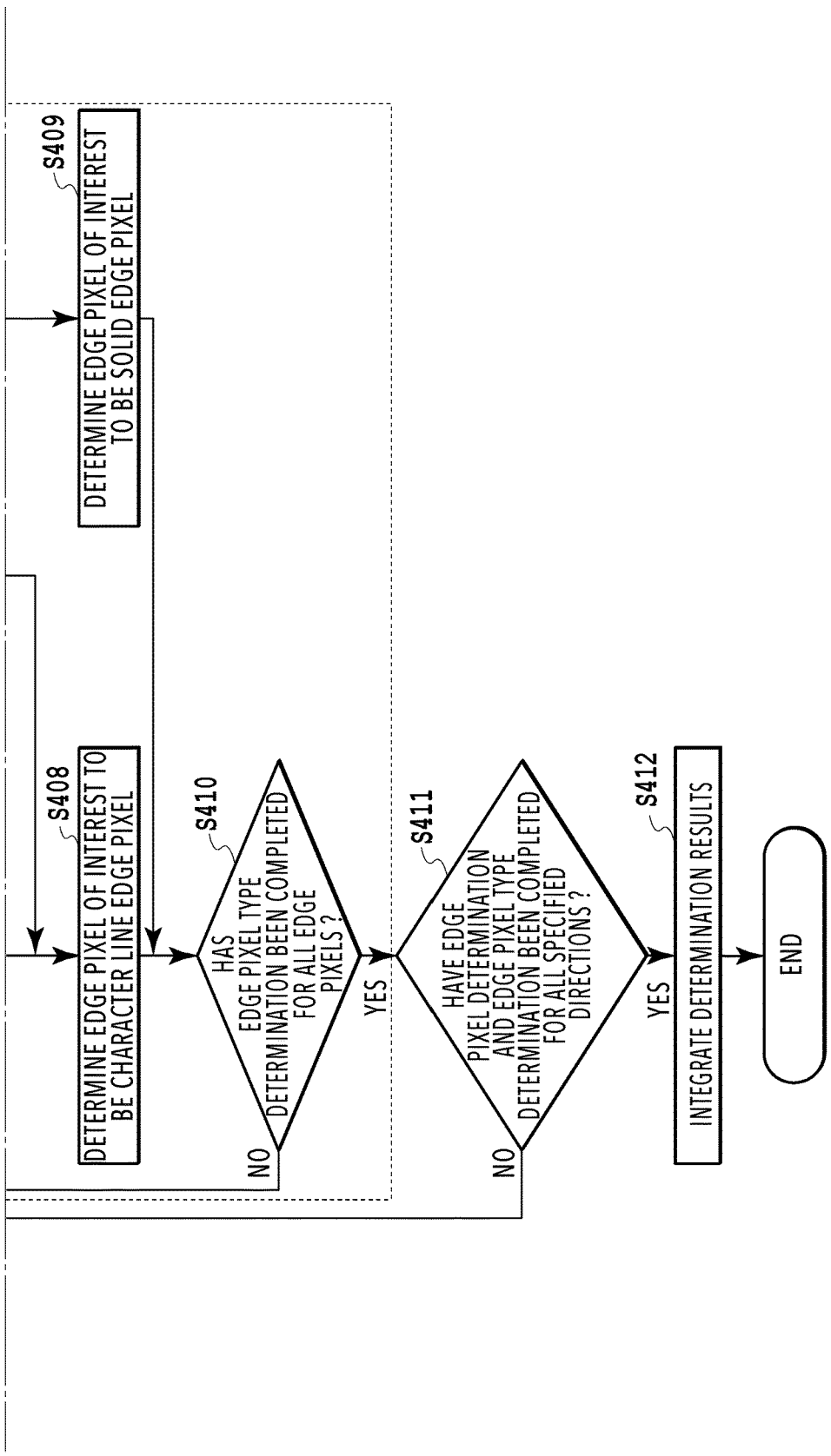

FIG. 4A and FIG. 4B are flowcharts showing a processing procedure of pixel attribute determination in the present embodiment. The processing by the flowcharts in FIG. 4A and FIG. 4B are performed by the CPU 101 reading program codes stored in the HDD 104 onto the RAM 102 and executing the program codes. Each symbol S in explanation in FIG. 4A and FIG. 4B means a step of the flowchart. This is also the same with the flowcharts in the drawings that follow FIG. 4A and FIG. 4B.

(Edge Pixel Determination)

At S401, the direction specification unit 121 specifies a direction in which a pixel of interest is selected. In the present embodiment, information indicating a direction in which a pixel of interest is selected, such as "rightward direction, leftward direction, upward direction, and downward direction", is stored in advance in the RAM 102. It is possible for the direction specification unit 121 to read the information from the RAM 102 and to sequentially specify a direction in which a pixel of interest is selected. In the following, the direction specified by the direction specification unit 121 is described as a "specified direction".

Figure 5:
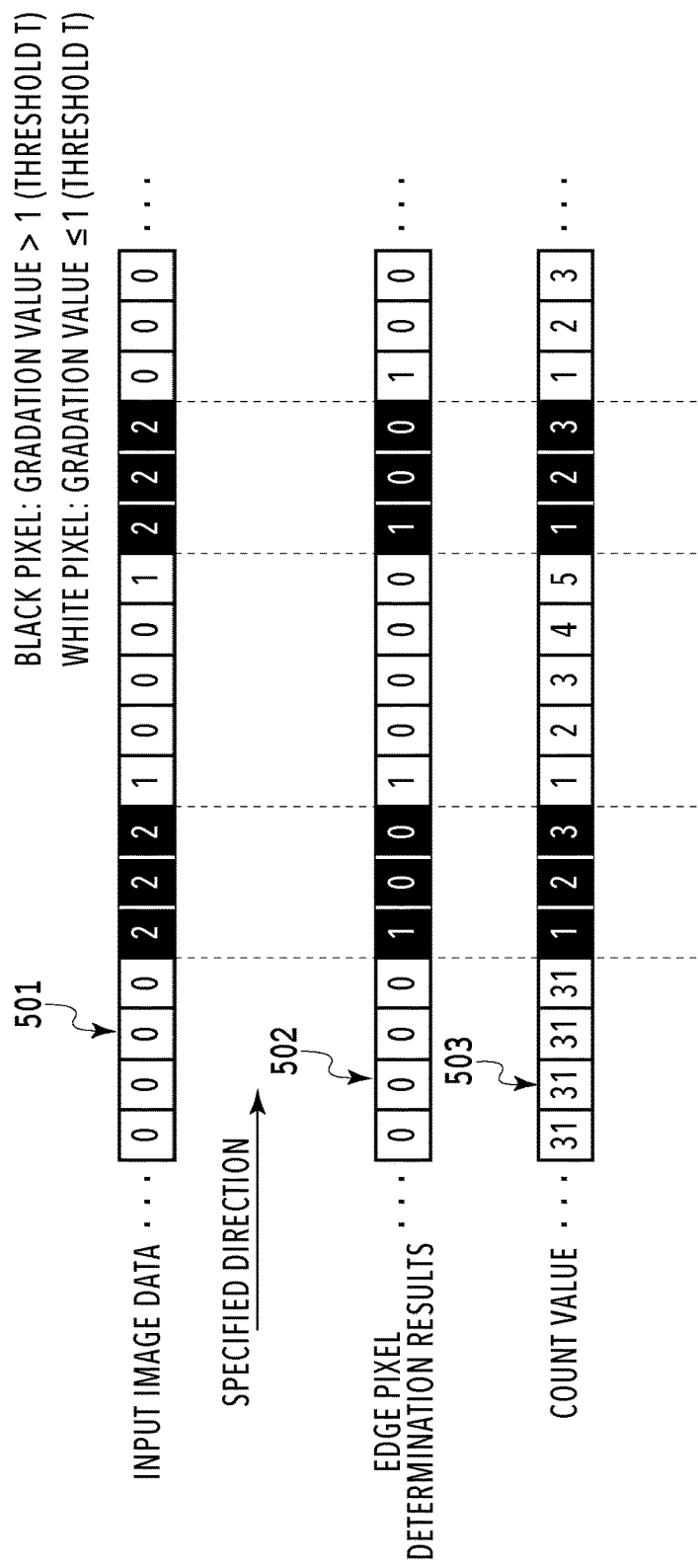
FIG. 5 is a schematic diagram explaining a specific example of edge pixel determination in the first embodiment.

At S402, the edge pixel determination unit 122 determines whether or not the pixel of interest is an edge pixel while sequentially selecting the pixel of interest in the specified direction. A specific technique of edge pixel determination is explained with reference to FIG. 5. FIG. 5 is a schematic diagram showing a specific example of the edge pixel determination in the present embodiment. In FIG. 5, pixel rows 501 to 503 represent a pixel row of input image data, a pixel row of edge pixel determination results, and a pixel row of count values, respectively. The block making up the pixel row represents one pixel. The numerical value within the block making up the pixel row 501 indicates a gradation value, the numerical value within the block making up the pixel row 502 indicates edge pixel determination results, and the numerical value within the block making up the pixel row 503 indicates a count value in the specified direction. In the present embodiment, the way the edge pixel determination is performed for multivalued image data of three tone levels (0 to 2) is explained, but the number of gradation values of multivalued image data is not limited to three and for example, the edge pixel determination may be similarly performed for multivalued image data of 256 tone levels (8 bits).

The edge pixel determination unit 122 determines whether or not the pixel of interest is an edge pixel. In the present embodiment, first, the edge pixel determination unit 122 determines whether or not the gradation value of the pixel of interest is larger than a predetermined threshold T while sequentially selecting the pixel of interest in the specified direction. In the present embodiment, the black pixel represents a pixel whose gradation value is larger than the threshold T and the white pixel represents a pixel whose gradation value is smaller than or equal to the threshold T. In this manner, it is possible for the edge pixel determination unit 122 of the present embodiment to classify a pixel area into at least two or more pixel areas, such as a pixel area in which the gradation value of the pixel of interest is smaller than or equal to the predetermined threshold T and a pixel area in which the gradation value of the pixel of interest is larger than the predetermined threshold T. Next, in the case where the gradation value determination results change, for example, in the case where the white pixel changes to the black pixel or the black pixel changes to the white pixel, the pixel of interest is detected as an edge pixel. In the case where the specified direction in FIG. 5 (rightward direction) is taken to be a reference, it is indicated that the pixel whose numerical value within the block in the pixel row 502 is "1" is an edge pixel and the pixel whose numerical value within the block is "0" is a non-edge pixel. As described above, in the present embodiment, the edge pixel can be said as a pixel located at the boundary between pixel areas.

Returning to FIG. 4A again, the number of consecutive pixels count unit 123 counts the number of consecutive pixels in the specified direction. The number of consecutive pixels count unit 123 counts pixels in the specified direction by taking an edge pixel as a start point and resets the count value in the case where the pixel of interest becomes an edge pixel again. Further, the number of consecutive pixels count unit 123 outputs a signal indicating that the count value is "31" even in the case where the count value becomes "32" (6 bits) or larger. The reason is that the count value larger than or equal to a predetermined number (32) does not contribute to improvement of the accuracy of the edge pixel type determination as well as that the number of signals necessary to transmit the count value is to be suppressed. In FIG. 5, the way the pixel row corresponding to one line of the input image data is processed is explained, but the same processing is performed also for the other lines. As explained above, by sequentially selecting the pixel of interest in the specified direction and performing the edge pixel determination and the number of consecutive pixels count, it is possible to acquire the data indicating the edge pixel position and the count value in the specified direction.

Figure 6:
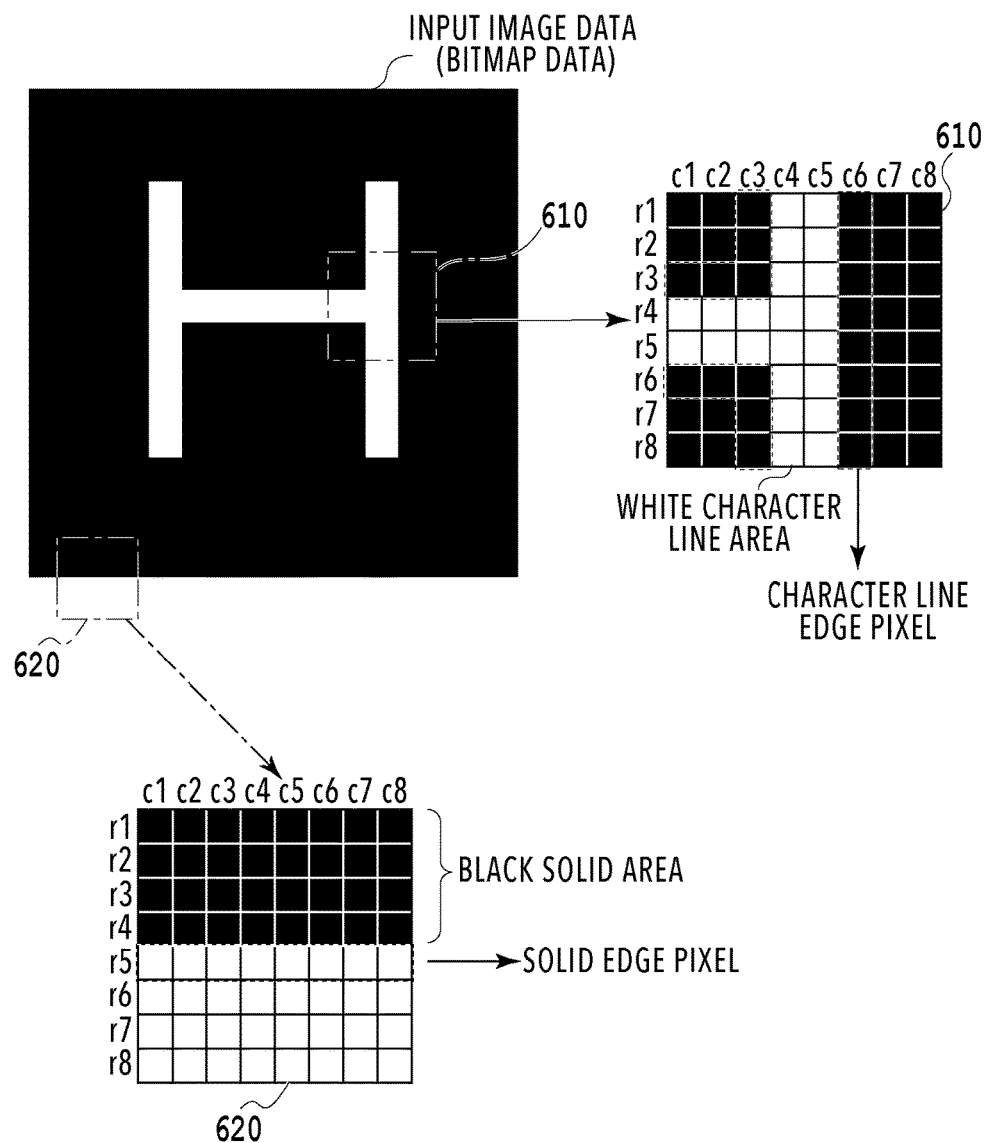
FIG. 6 is a schematic diagram explaining a specific example of an edge pixel type in the first embodiment.

S404 to S410 show the processing procedure of the edge pixel type determination to determine the type of an edge pixel. Here, the character line edge pixel and the solid edge pixel are explained with reference to FIG. 6. FIG. 6 shows a specific example of input image data (bitmap data) that is the target of processing. For convenience of explanation, it is assumed that the input image data in FIG. 6 has already been classified into the pixel area (black pixel area) in which the gradation value is larger than the threshold T and the pixel area (white pixel area) in which the gradation value is smaller than or equal to the threshold T, and only a partial area with a character line "H" as a center is shown.

In FIG. 6, an enlarged view of an area 610 and an enlarged view of an area 620 included in the input image data are further shown, respectively. The area 610 is obtained by cutting out an area of eight horizontal pixels (c1 to c8) and eight vertical pixels (r1 to r8) and includes a white character line area. For example, in the area 610, the pixel surrounded by a dotted line as the c6 column, is an edge pixel located at the boundary with the above-described white character line area, that is, a character line edge pixel. On the other hand, the area 620 is obtained by cutting out an area of eight horizontal pixel (c1 to c8) and eight vertical pixels (r1 to r8) and includes a black solid area. For example, in the area 620, the pixel surrounded by a dotted line as the r5 row is an edge pixel located at the boundary with the above-described black solid area, that is, a solid edge pixel. It is possible for the type determination unit 124 of the present embodiment to classify the edge pixel specified at S402 into the character line edge pixel and the solid edge pixel by performing the following edge pixel type determination (S404 to S410) for the input image data.

(Edge Pixel Type Determination)

Returning to FIG. 4A again, the type determination unit 124 performs the edge pixel type determination to determine the type of an edge pixel based on the results at S401 to S403. The edge pixel type determination is performed at S404 to S410 defined by a dotted line in the flowcharts in FIG. 4A and FIG. 4B.

At S404, the type determination unit 124 selects an edge pixel of interest from among unprocessed edge pixels.

Figures 7A, 7B, 7C:
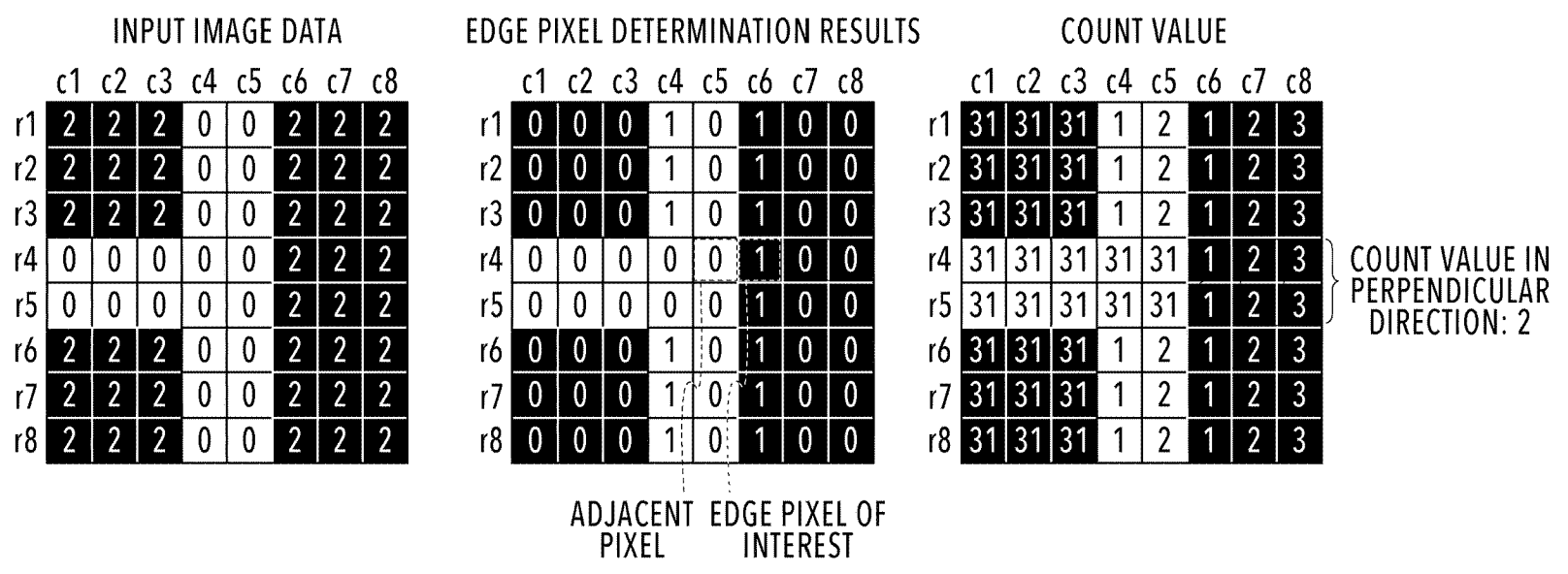

At S405, the type determination unit 124 first selects a pixel included in another pixel area different from the pixel area in which the edge pixel of interest is included (hereinafter, described as an "adjacent pixel") from among pixels adjacent to the edge pixel of interest. Here, with reference to FIG. 7A and FIG. 7B, the position relationship between the edge pixel of interest and the adjacent pixel is explained. FIG. 7A shows a partial area cut out from the input image data, which has the same pixel configuration as that of the area 610 in FIG. 6. It is assumed that, unlike FIG. 6, outside the area in FIG. 7A, the pixels of the same type as that of the outermost pixel are arranged. The results of performing the edge pixel determination (S402) in the rightward direction, which is the specified direction, for the area in FIG. 7A are shown in FIG. 7B. In the case where the pixel in the sixth column and in the fourth row (hereinafter, described in the format of the "pixel (c6, r4)") in the area in FIG. 7B is selected as the edge pixel of interest, the adjacent pixel is the pixel (c5, r4), which is adjacent to the edge pixel of interest (c6, r4) in the white pixel area different from the pixel area of the edge pixel of interest (c6, r4).

Next, at S405, the type determination unit 124 compares the count value in the adjacent pixel and a first threshold. In the area in FIG. 7C, the count value counted in the specified direction (rightward direction) is shown for each pixel. As shown in FIG. 7C, the count value in the adjacent pixel (c5, r4) is "31". This means that at least thirty-one consecutive white pixels exist in the specified direction (rightward direction) from the edge pixel that is the start point in the white pixel area up to the adjacent pixel (c5, r4) located at the boundary with the black pixel area. The first threshold that is the target of comparison with the count value may take various values, and the first threshold in the present embodiment is set to "16". In the case of FIG. 7C, the results of the comparison between the count value "31" and the first threshold "16" are that the count value>the first threshold, and therefore, "NO" is determined in the determination processing at S405.

In the case where the count value is smaller than or equal to the first threshold (S405: YES), the processing advances to S408 and the edge pixel of interest is determined to be a character line edge pixel. On the other hand, in the case where the count value is larger than the first threshold (S405: NO), the processing advances to S406. The first threshold may be made different according to whether or not the gradation value of the edge pixel of interest is larger than the threshold T. By making the first threshold different, for example, it is possible to obtain different determination results between the case where the edge pixel of interest is included in the black pixel area and the case where the edge pixel of interest is included in the white pixel area.

At S406, the type determination unit 124 counts the number of consecutive pixels in the direction perpendicular to the specified direction with the adjacent pixel (c5, r4) as the start point this time. At this time, the type determination unit 124 counts the number of consecutive pixels in the direction perpendicular to the specified direction, whose count value is larger than the first threshold. To explain specifically with reference to FIG. 7C, the direction perpendicular to the specified direction (rightward direction) is the upward direction and the downward direction. In the white pixel area in FIG. 7C, the pixel whose count value is larger than the first threshold in the upward direction and in the downward direction with the adjacent pixel (c5, r4) as the start point is the pixel (c5, r4) and the pixel (c5, r5). That is, in FIG. 7C, it is possible for the type determination unit 124 to acquire "2" as the number of consecutive pixels in the direction perpendicular to the specified direction (rightward direction), whose count value is larger than the first threshold. In the following, the present embodiment is explained by describing the count value obtained by counting the number of consecutive pixels in the specified direction as the "count value in the specified direction" and the count value obtained by counting the number of consecutive pixels in the direction perpendicular to the specified direction as the "count value in the perpendicular direction", respectively.

At S407, the type determination unit 124 compares the count value in the perpendicular direction and a second threshold. As shown in FIG. 7C, the count value in the perpendicular direction is "2". The second threshold that is the target of the comparison with the count value in the perpendicular direction may take various values, and the second threshold in the present embodiment is set to "16". In the case of FIG. 7C, the results of the comparison between the count value "2" in the perpendicular direction and the second threshold "16" are that the count value in the perpendicular direction the second threshold, and therefore, "YES" is determined in the determination processing at S407.

In the case where the count value in the perpendicular direction is smaller than or equal to the second threshold (S407: YES), the processing advances to S408 and the edge pixel of interest is determined to be a character line edge pixel. On the other hand, in the case where the count value in the perpendicular direction is larger than the second threshold (S407: NO), the processing advances to S409 and the edge pixel of interest is determined to be a solid edge pixel. It may also be possible to make the second threshold different according to whether or not the gradation value of the edge pixel of interest is larger than the threshold T. By making the second threshold different, for example, it is possible to obtain different determination results between the case where the edge pixel of interest is included in the black pixel area and the case where the edge pixel of interest is included in the white pixel area.

In the present embodiment, the first threshold and the second threshold are set based on the characteristics that the number of consecutive pixels in the character line area is relatively smaller than the number of consecutive pixels in the solid area. As above, by using the thresholds that focus attention on the number of consecutive pixels in the character line area and the solid area, respectively, it is possible to perform the edge pixel type determination with a simple configuration compared to the pattern matching that requires a plurality of pixel patterns for collation. The specific value of the first threshold and the second threshold may be set to a value other than "16" in accordance with the operating environment of the image processing apparatus 100. In the case where a user sets the first threshold and the second threshold, it is possible for the image processing apparatus 100 to receive the setting from a touch panel connected via the external connection I/F 105.

At S408, the type determination unit 124 outputs a flag signal "1" to the edge pixel determined to be a character line edge pixel. Similarly, at S409, the type determination unit 124 outputs a flag signal "2" to the edge pixel determined to be a solid edge pixel.

At S410, whether or not the edge pixel type determination has been completed for all the edge pixels is determined. In the case where the edge pixel type determination has been completed for all the edge pixels (S410: YES), the processing advances to S411. In the case where the edge pixel type determination has not been completed for all the edge pixels (S410: NO), the processing returns to S404 again and the edge pixel type determination (S404 to S410) is repeated.

At S411, whether or not the edge pixel determination and the edge pixel type determination have been completed for all the specified directions is determined. In the case where the edge pixel determination and the edge pixel type determination have been completed for all the specified directions (S411: YES), the processing advances to S412. In the case where the edge pixel determination and the edge pixel type determination have not been completed for all the specified directions (S411: NO), the processing is repeated from the setting of the specified direction (S401) and the edge pixel determination and the edge pixel type determination are performed in a plurality of directions.

Figure 8:
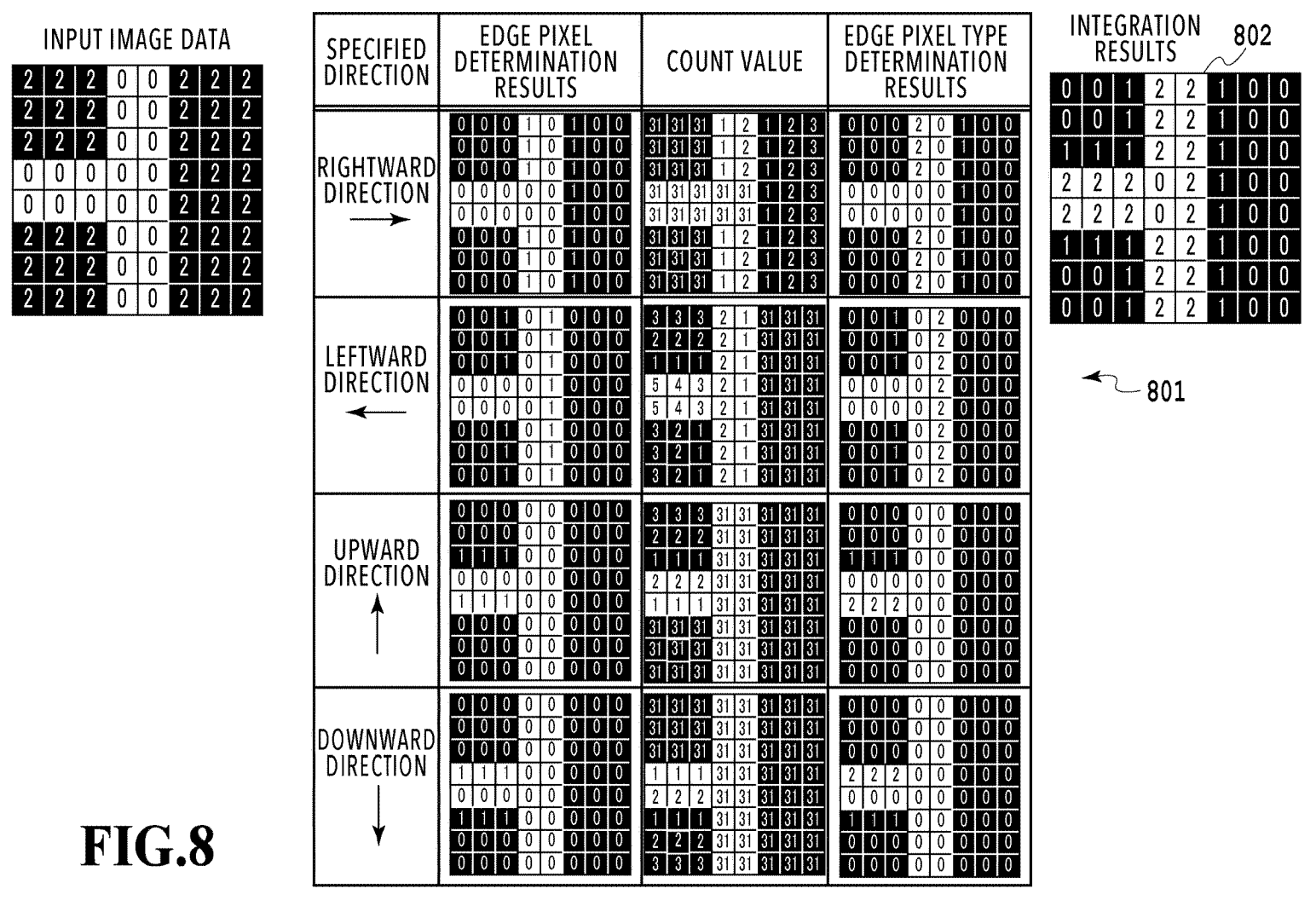

At S412, the integration unit 125 integrates the edge pixel type determination results for each specified direction. A table 801 in FIG. 8 shows the edge pixel determination results, the count values, and the edge pixel type determination results, respectively, of the input image data (FIG. 7A) in association with one another for each specified direction. Then, integration results 802 further indicate the results of integrating the edge pixel type determination results for each specified direction. In the integration results 802, "1" indicates that the pixel is a character line edge pixel and "2" indicates that the pixel is a solid edge pixel. In the integration results 802, "0" indicates that the pixel is a pixel that is not the target of the edge pixel type determination, that is, a non-edge pixel.

In the present embodiment, in the case where the edge pixel type determination results for each specified direction do not conflict with the other for the edge pixel of interest, the integration unit 125 outputs the determination results as the integration results. On the other hand, in the case where the edge pixel type determination results for each specified direction conflict with the other for the edge pixel of interest, the integration unit 125 selects one of the determination results and output the determination results as the integration results. In this case, by setting selection priority of edge pixel type determination results as "character line edge pixel>solid edge pixel", it is possible to preferentially select the character line edge pixel. Alternatively, it may also be possible to preferentially select the edge pixel type determination results in the specified direction to which high priority is set, for example, such as "rightward direction>leftward direction>upward direction>downward direction". Further alternatively, it may also be possible to select the edge pixel type larger in number by comparing the number of specified directions in which the pixel is determined to be a character line edge pixel and the number of specified directions in which the pixel is determined to be a solid edge pixel for the edge pixel of interest.

(Line Width Correction)

Figure 9:
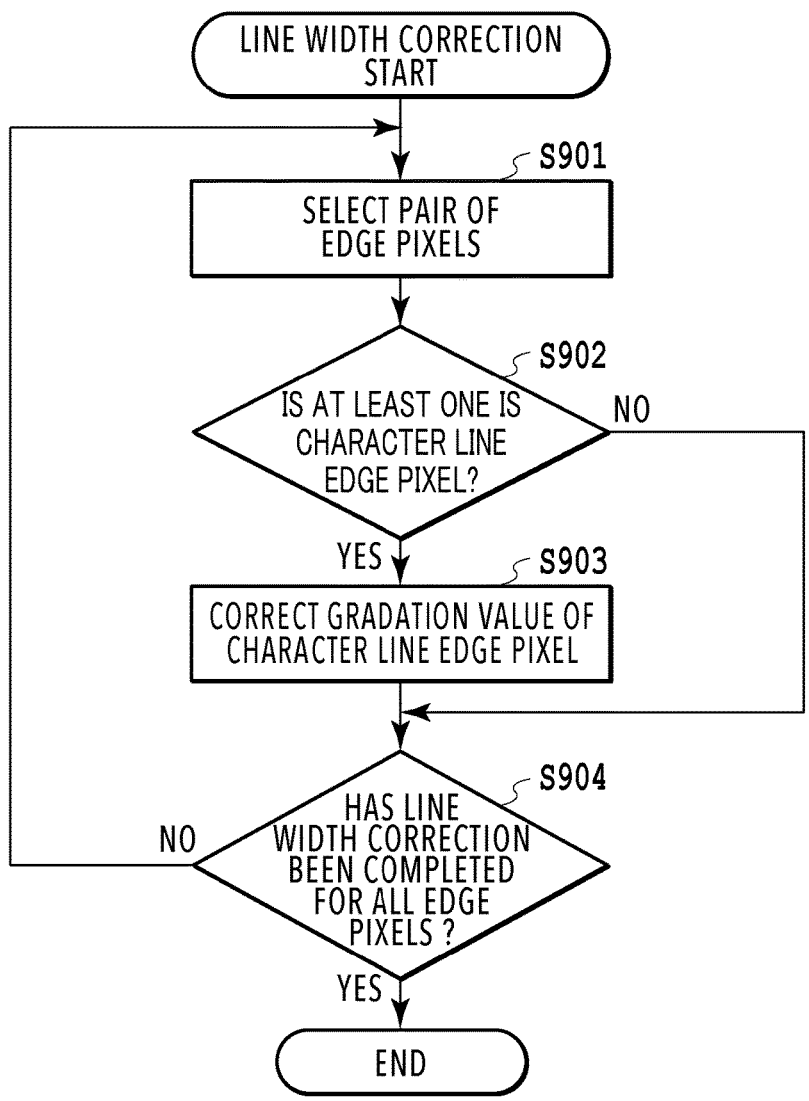
FIG. 9 is a flowchart showing a processing procedure of line width correction in the first embodiment.

FIG. 9 is a flowchart showing a processing procedure of line width correction in the present embodiment. First, at S901, the line width correction unit 130 selects an unprocessed pair of edge pixels. Here, a pair of edge pixels in the present embodiment refers to a combination of two edge pixels located at the boundary between the pixel areas whose gradation value determination results are different, such as the edge pixel of interest and the adjacent pixel in FIG. 7B.

At S902, the line width correction unit 130 determines whether or not at least one character line edge pixel is included in the pair of edge pixels selected at S901. In the case where a character line edge pixel is included (S902: YES), the processing advances to S903. On the other hand, in the case where no character line edge pixel is included (S902: NO), S903 is skipped and the processing advances to S904.

At S903, the line width correction unit 130 corrects the gradation value of the character line edge pixel. Specifically, by the line width correction unit 130 increasing or decreasing the gradation value of the character line edge pixel, such as decreasing the gradation value of the input image data from "2" to "1", the line width of the character line represented by the input image data is corrected.

At S904, the line width correction unit 130 determines whether or not the line width correction has been completed for all the edge pixels. In the case where the line width correction has been completed for all the edge pixels (S904: YES), the processing by this flowchart is terminated and the line width correction unit 130 outputs the image data after the correction. On the other hand, in the case where the line width correction has not been completed for all the edge pixels (S904: NO), the processing returns to S901 again and the processing at S901 to S904 is performed for an unprocessed pair of edge pixels.

Figure 10:
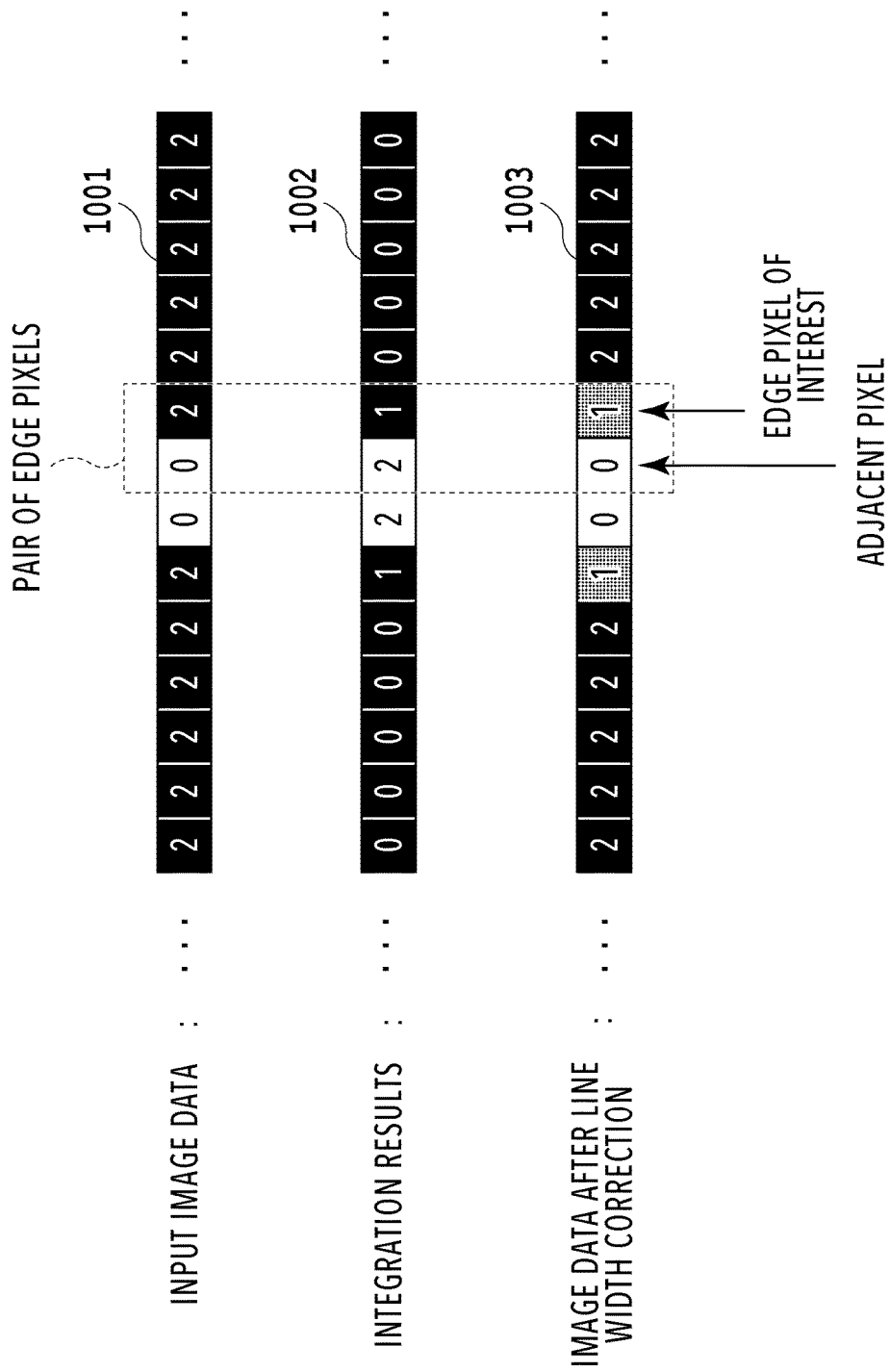
FIG. 10 is a schematic diagram showing a specific example of line width correction in the first embodiment.

FIG. 10 is a schematic diagram showing a specific example of the line width correction in the present embodiment. In FIG. 10, pixel rows 1001 to 1003 represent a pixel row of input image data, a pixel row of integration results, and a pixel row of image data after line width correction, respectively. Each block making up each pixel row represents one pixel. The numerical value within the block making up the pixel rows 1001 and 1003 represents a gradation value (0 to 2) and the numerical value within the block making up the pixel row 1002 represents the type of an edge pixel (0: non-edge pixel, 1: character line edge pixel, 2: solid edge pixel), respectively.

In the example in FIG. 10, as shown by the pixel row 1002, the edge pixel types of the two pixels making up the selected pair of edge pixels are a solid edge pixel and a character line edge pixel, respectively. Then, it is known that the gradation value of the character line edge pixel of the selected pair of edge pixels decreases from "2" to "1". By decreasing the gradation value of the character line edge pixel as above, it is possible to improve the image quality of the character line. In more detail, it is possible to correct blocked up shadows in the character line area, which result from toner scattering and blurring of ink in the printing process in the image forming apparatus 200. In the case where the black character line area is displayed in the white solid area, which is opposite of the example in FIG. 10, it may also be possible for the line width correction unit 130 to increase the gradation value of the character line edge pixel.

As explained above, the edge pixel type determination of the present embodiment is performed mainly by the processing to count the number of consecutive pixels and the processing to compare the count value and the threshold. With the processing such as this, it is possible to suppress the amount of consumption of computer resource compared to the pattern matching used in the conventional edge pixel type determination. Further, it is possible for the image processing apparatus 100 of the present embodiment to perform line width correction adaptively for the character line edge pixel.

[Second Embodiment]
(Density Unevenness Correction)

In a second embodiment, an embodiment is explained in which density unevenness correction is performed for a solid area based on edge pixel type determination results. In the following, explanation of the portions in common to those of the first embodiment is simplified or omitted and in the following, points unique to the present embodiment are explained mainly.

Figure 11:
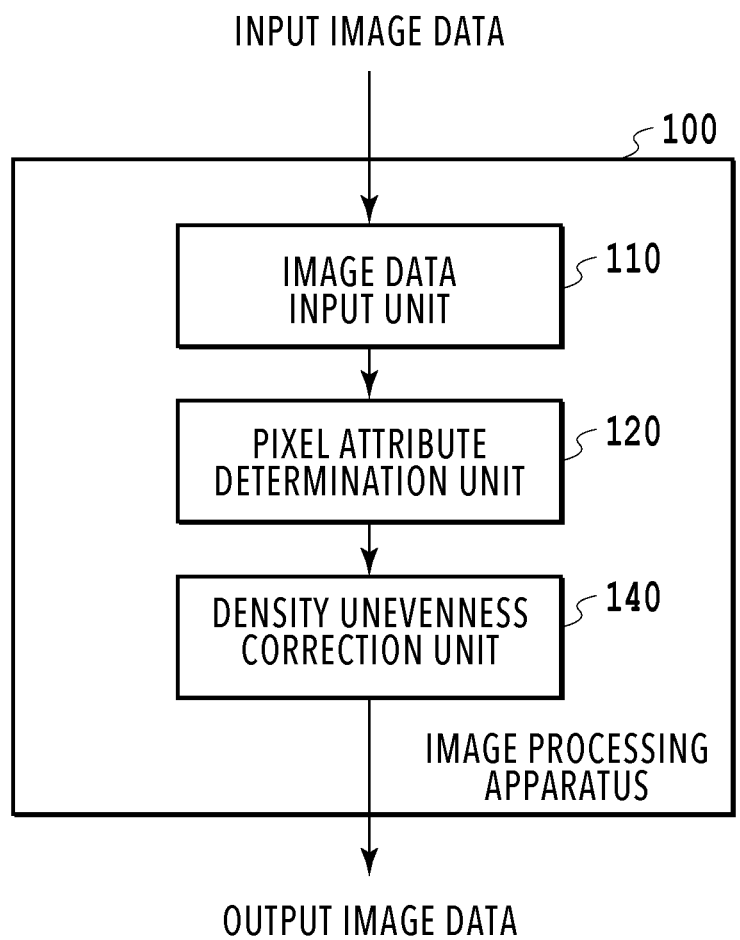
FIG. 11 is a software function configuration diagram of an image processing apparatus in a second embodiment.

FIG. 11 is a block diagram showing a software function configuration of the image processing apparatus 100 in the present embodiment. The image processing apparatus 100 of the present embodiment includes the image data input unit 110, the pixel attribute determination unit 120, and a density unevenness correction unit 140.

Figure 12:
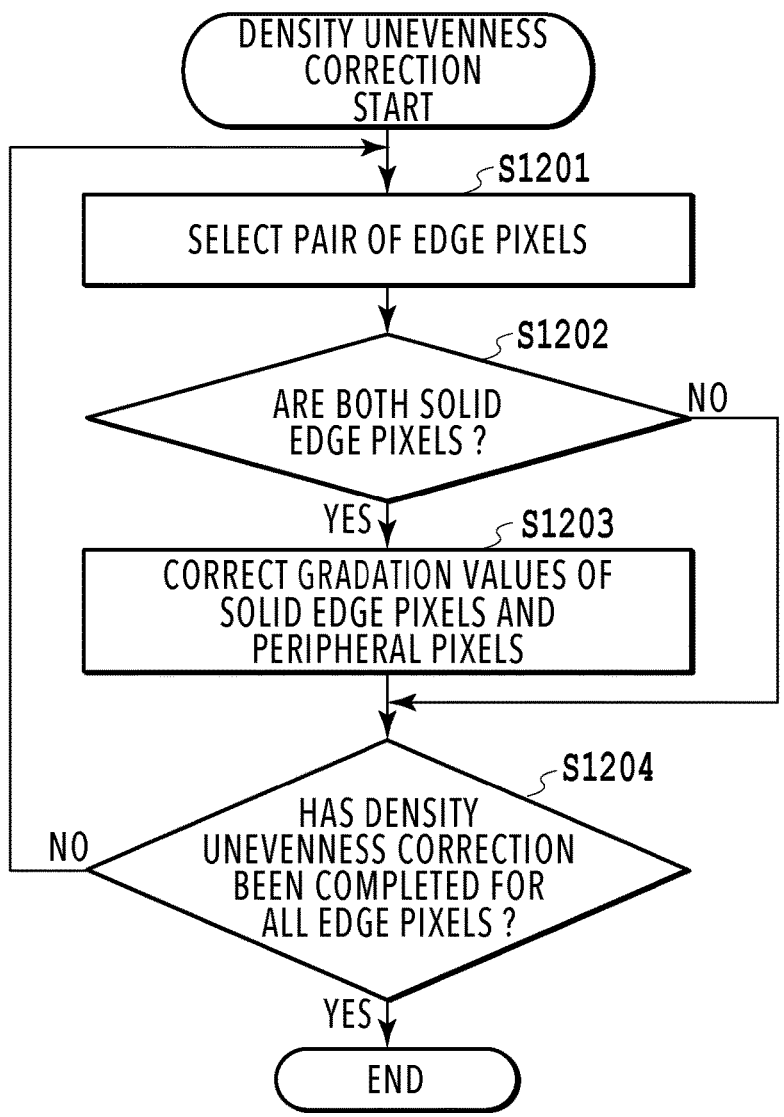
FIG. 12 is a flowchart showing a processing procedure of density unevenness correction in the second embodiment.

FIG. 12 is a flowchart showing a processing procedure of the density unevenness correction in the present embodiment. First, at S1201, an unprocessed pair of edge pixels is selected as at S901.

At S1202, the density unevenness correction unit 140 determines whether or not both the pixels making up the pair of edge pixels selected at S1201 are solid edge pixels. In the case where both are solid edge pixels (S1202: YES), the processing advances to S1203. In the case where at least one is not a solid edge pixel (S1202: NO), S1203 is skipped and the processing advances to S1204.

At S1203, the density unevenness correction unit 140 corrects the gradation values of the solid edge pixels and the peripheral pixels. In more detail, the density unevenness correction unit 140 decreases the gradation values of the pixel (black pixel) whose gradation value is larger than the threshold T of the solid edge pixels included in the pair of edge pixels and a predetermined number of consecutive pixels from the pixel in the same pixel area.

At S1204, the density unevenness correction unit 140 determines whether or not the density unevenness correction has been completed for all the edge pixels. In the case where the density unevenness correction has been completed for all the edge pixels (S1204: YES), the processing by this flowchart is terminated and the density unevenness correction unit 140 outputs the image data after the correction. On the other hand, in the case where the density unevenness correction has not been completed for all the edge pixels (S1204: NO), the processing returns to S1201 again and the processing at S1201 to S1204 is performed for an unprocessed pair of edge pixels.

Figure 13:
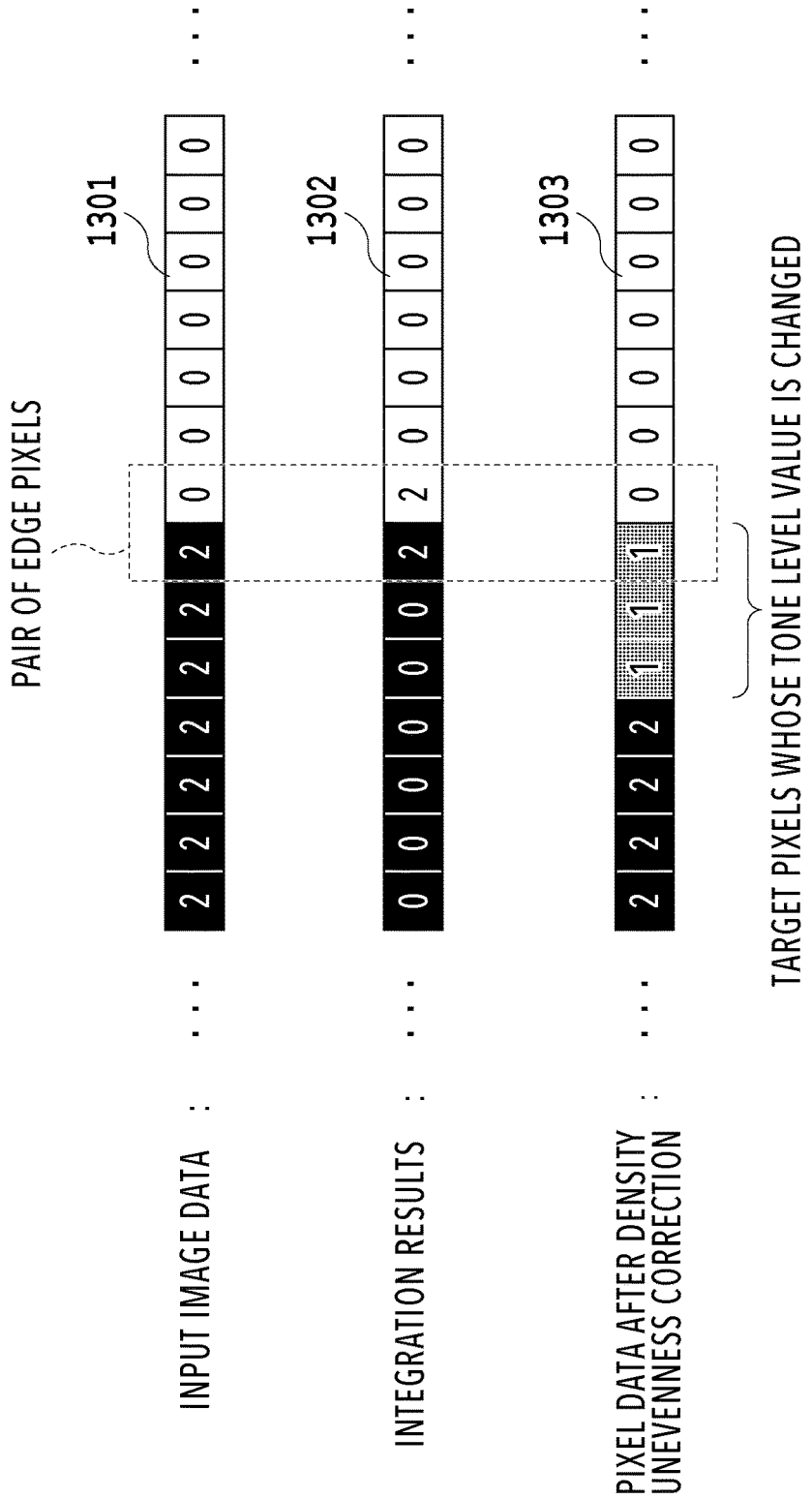
FIG. 13 is a schematic diagram showing a specific example of density unevenness correction in the second embodiment.

A specific technique of the density unevenness correction is explained with reference to FIG. 13. FIG. 13 is a schematic diagram showing a specific example of the density unevenness correction in the present embodiment. In FIG. 13, pixel rows 1301 to 1303 represent a pixel row of input image data, a pixel row of integration results, and a pixel row of image data after the density unevenness correction, respectively. Further, each block making up each pixel row represents one pixel. The numerical value within the block making up the pixel rows 1301 and 1303 represents a gradation value (0 to 2) and the numerical value within the block making up the pixel row 1302 represents the type of an edge pixel (0: non-edge pixel, 1: character line edge pixel, 2: solid edge pixel), respectively.

In the present embodiment, in the case where both the edge pixels included in the pair of edge pixels are determined to be solid edge pixels, the gradation values of the solid edge pixel having a gradation value larger than a predetermined value and a group of pixels continuous with the solid edge pixel are decreased. Then, it is known that the gradation values of the pixel (black pixel) whose gradation value is larger than the threshold T of the two solid edge pixels and the predetermined number of consecutive pixels from the pixel in the same pixel area are decreased from "2" to "1". As a result of this, by decreasing the amount of developer to be attached to the solid edge pixel and in the vicinity of the solid edge pixel in the electrophotographic printing process, it is possible to suppress the so-called edge effect and to improve the output image quality.

As explained above, it is possible for the image processing apparatus 100 of the present embodiment to perform the density unevenness correction adaptively for the solid edge pixel, in addition to the effect of the first embodiment.

[Third Embodiment]

In the first embodiment, it is necessary to perform the edge pixel determination in all the specified directions (for example, rightward direction, leftward direction, upward direction, downward direction) in order to specify the positions of all the edge pixels in the input image data. In a third embodiment, an embodiment is explained in which the edge pixel determination and the edge pixel type determination are performed only in one predetermined direction (for example, rightward direction). Explanation of the portions in common to those of the first embodiment is simplified or omitted and in the following, points unique to the present embodiment are explained mainly.

Figure 14:
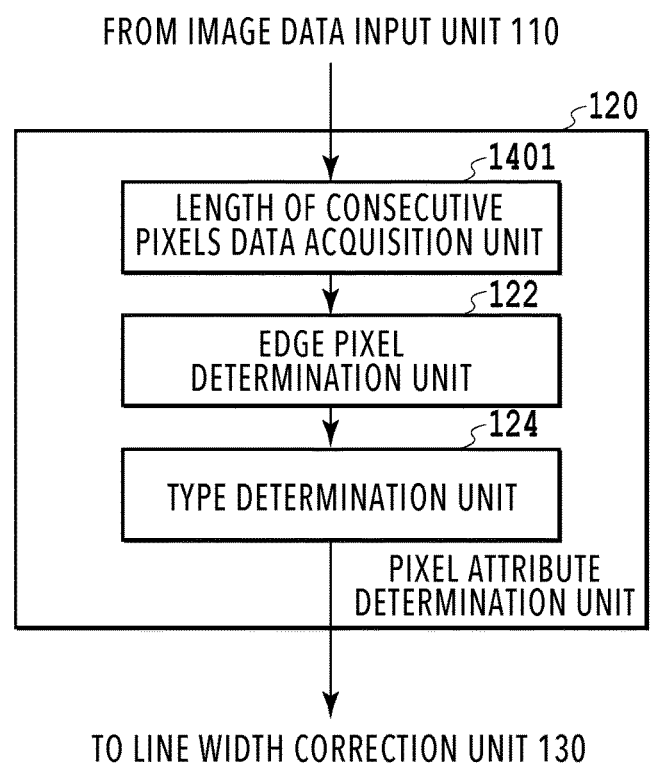
FIG. 14 is a software function configuration diagram of a pixel attribute determination unit in a third embodiment.

FIG. 14 is a block diagram showing a software function configuration of the pixel attribute determination unit 120 in the present embodiment. The pixel attribute determination unit 120 of the present embodiment has a length of consecutive pixels data acquisition unit 1401, the edge pixel determination unit 122, and the type determination unit 124. The length of consecutive pixels data acquisition unit 1401 acquires length of consecutive pixels data indicating a length of consecutive pixels between edge pixels in the first direction. The edge pixel determination unit 122 determines whether or not the pixel of interest is an edge pixel while sequentially selecting the pixel of interest. The type determination unit 124 determines the type of the edge pixel of interest.

Figure 15:
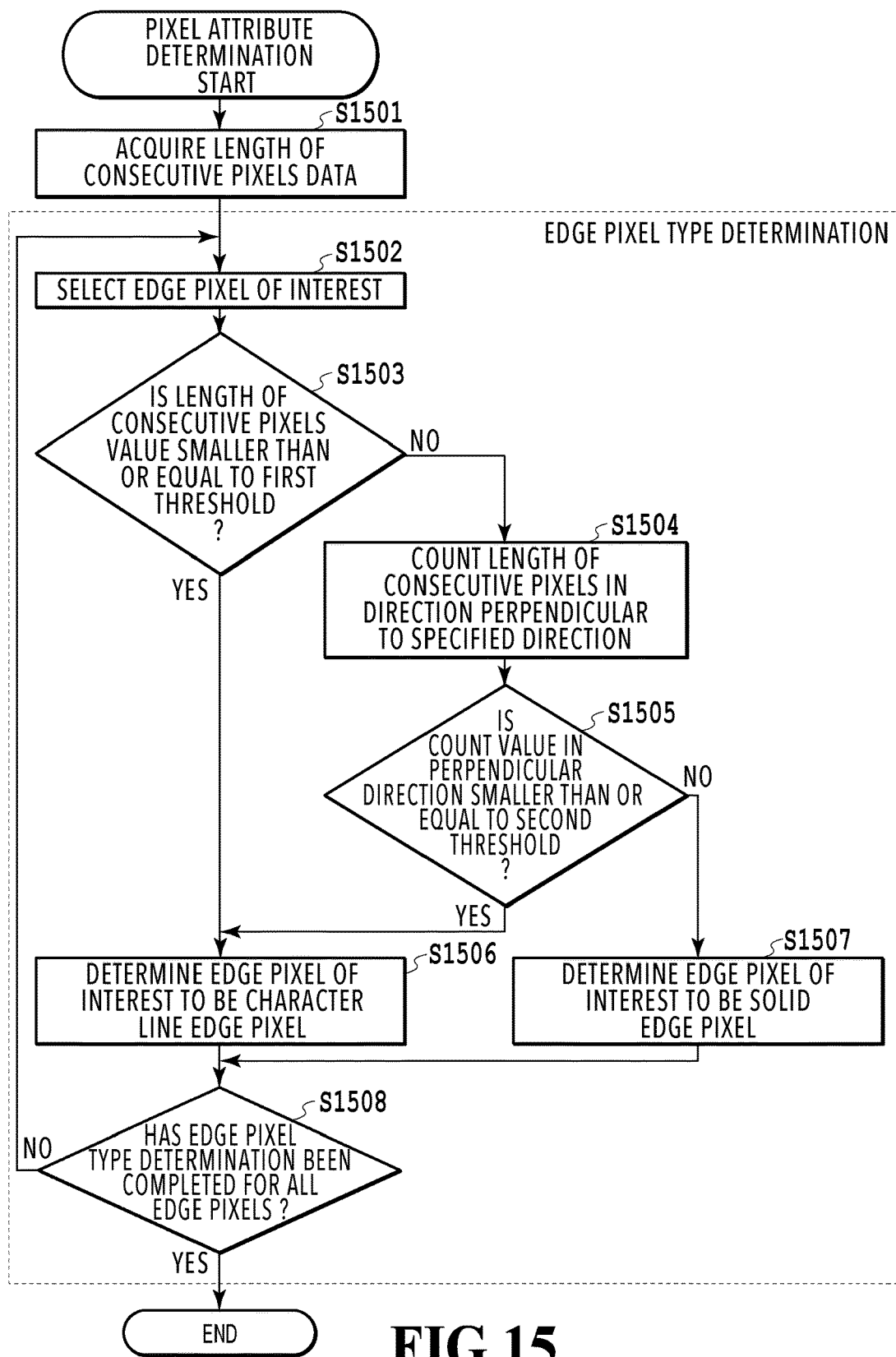
FIG. 15 is a flowchart showing a processing procedure of pixel attribute determination in the third embodiment.

FIG. 15 is a flowchart showing a processing procedure of pixel attribute determination in the present embodiment. In the following, with reference to the flowchart in FIG. 15, the processing procedure of the pixel attribute determination in the present embodiment is explained.

At S1501, the length of consecutive pixels data acquisition unit 1401 acquires length of consecutive pixels data indicating a length of consecutive pixels between edge pixels in the first direction. The acquired length of consecutive pixels data is stored in the RAM 102. In the present embodiment, the length of consecutive pixels data acquisition unit 1401 acquires length of consecutive pixels data by using pattern matching, which is a publicly known technique.

Figure 16:
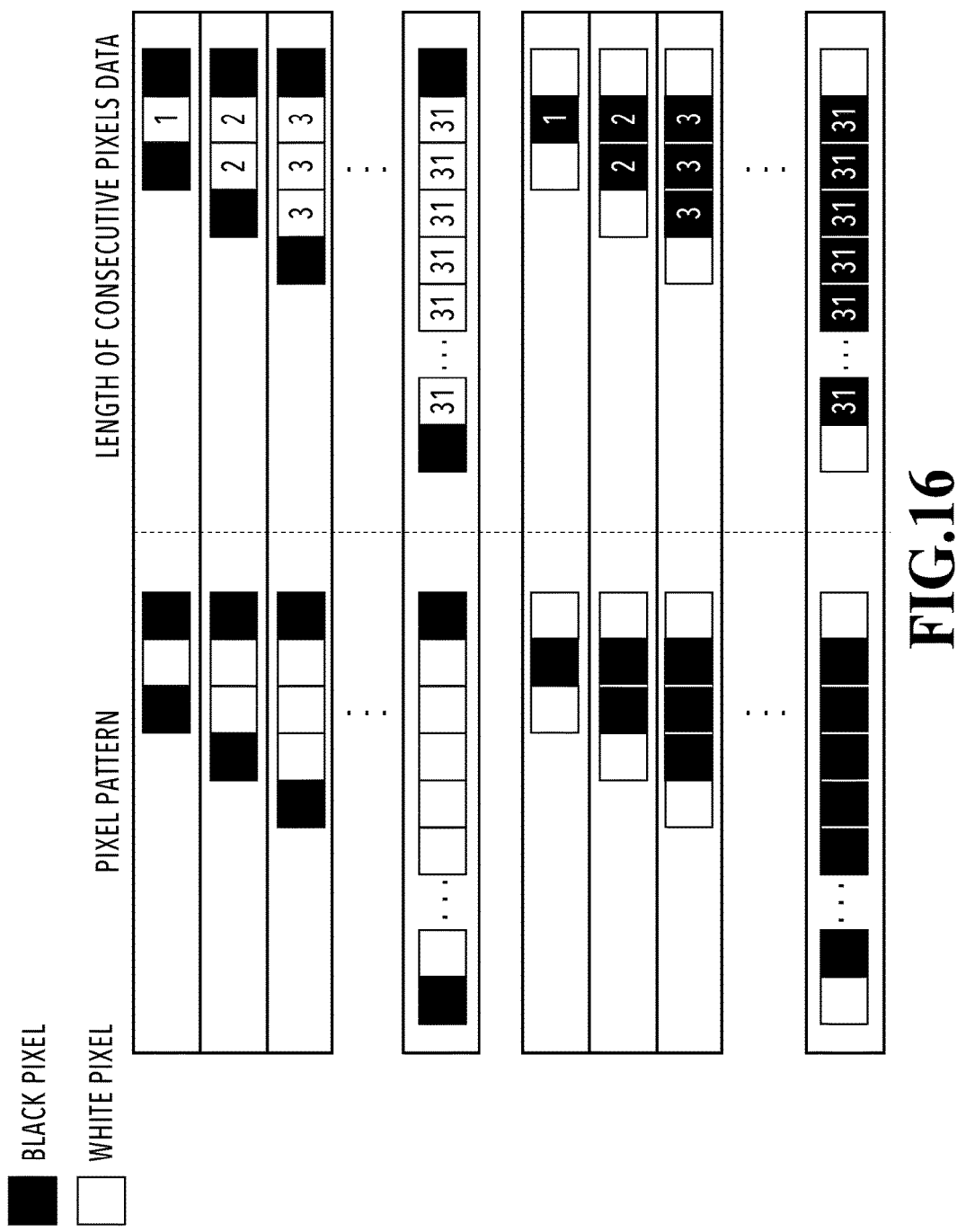
FIG. 16 is a diagram showing a correspondence relationship between pixel patterns and length of consecutive pixels data in the third embodiment.

A specific technique of acquiring length of consecutive pixels data by using pattern matching is explained with reference to FIG. 16 and FIG. 17. The image processing apparatus 100 of the present embodiment stores a plurality of pixel patterns in advance in the HDD 104. FIG. 16 is a diagram showing a correspondence relationship between a plurality of pixel patterns stored in advance and length of consecutive pixels data. The length of consecutive pixels data acquisition unit 1401 of the present embodiment performs pattern matching between input image data and a plurality of pixel patterns. In the case where a pixel pattern that is matched with the input image data exists, the length of consecutive pixels data corresponding to the pixel pattern is stored in the RAM 102. In the case where no pixel pattern is matched with the input image data, as the length of consecutive pixels data, "31" is stored in the RAM. The length of consecutive pixels data acquisition unit 1401 of the present embodiment acquires the length of consecutive pixels data from "1" to "31" as a result of pattern matching. The reason is that the length of consecutive pixels data longer than or equal to a predetermined length (32) does not contribute to improvement of the accuracy of the edge pixel type determination as well as that the number of bits of a signal necessary to transmit the length of consecutive pixels data is to be suppressed.

Next, the length of consecutive pixels data acquisition unit 1401 classifies the pixels making up multivalued image data into a pixel area (white pixel area) in which the gradation value is smaller than or equal to the threshold T and a pixel area (black pixel area) in which the gradation value is larger than the threshold T as in the first embodiment. A specific example of the length of consecutive pixels data that can be acquired by the processing up to this processing is shown in FIG. 17. In FIG. 17, pixel rows 1701 and 1702 represent a pixel row of input image data and a pixel row of length of consecutive pixels data, respectively. The pixel row 1701 represents a partial area cut out from input image data that is actually input to the image processing apparatus 100. For convenience of explanation, it is assumed that the pixels of the same type as that of the outermost pixel are arranged outside the area represented by the pixel row 1701. Further, each block making up each pixel row represents one pixel. The numerical value within the block making up the pixel row 1701 indicates a gradation value. The numerical value within the block making up the pixel row 1702 indicates a length of consecutive pixels value acquired as a result of the above-described pattern matching.

Figure 17:
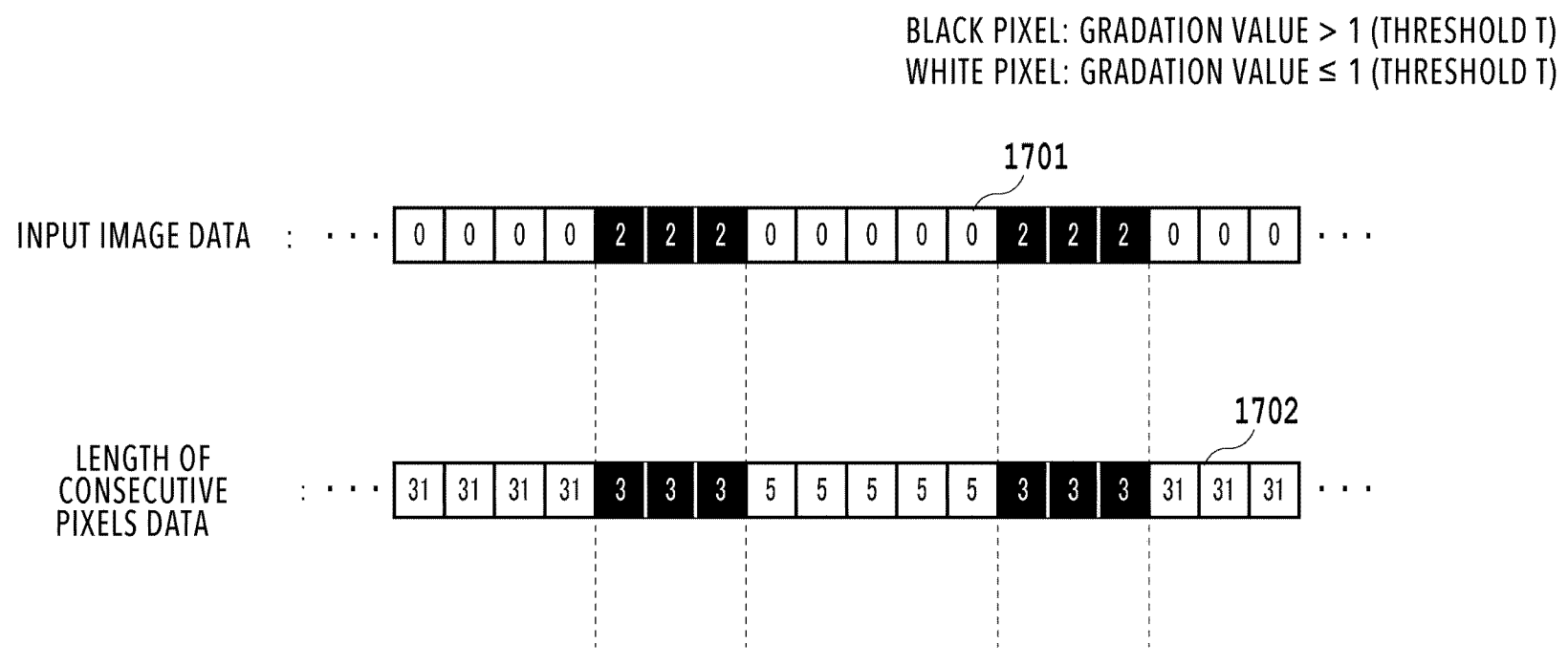

As shown in the pixel row 1702 in FIG. 17, all the pixels in the same pixel area have the same length of consecutive pixels value (for example, "3" and the like). Because of this, it may also be possible to use a counter to acquire length of consecutive pixels data as in the first embodiment. In this case, by counting the length of consecutive pixels in the pixel area and by taking the largest count value to be the length of consecutive pixels value of the consecutive pixels, it is possible to acquire the same length of consecutive pixels data as that of the above-described pattern matching.

Returning to FIG. 15 again, at S1502, the edge pixel determination unit 122 first determines whether or not the pixel of interest is an edge pixel. In the present embodiment, the edge pixel determination unit 122 first determines whether or not at least one adjacent pixel in a group of adjacent pixels, which are adjacent to the pixel of interest from above, below, left, and right, is included in another pixel area different from that of the pixel of interest while sequentially selecting the pixel of interest in the first direction. Then, in the case where at least one adjacent pixel is included in another pixel area, the pixel of interest is determined to be an edge pixel of interest.

Here, with reference to FIG. 18A, a specific example of a technique of selecting an edge pixel of interest is explained. FIG. 18A displays a partial area cut out from input image data that is actually input to the image processing apparatus 100. For convenience of explanation, it is assumed that the pixels of the same type as that of the outermost pixel are arranged outside the area displayed in FIG. 18A. As an example, in the case where a pixel (c2, r3) is selected as a pixel of interest, pixels adjacent to the pixel of interest from above, below, left, and right are (c2, r2), (c2, r4), (c1, r3), and (c3, r3), respectively, and the corresponding gradation values are "2", "0", "2", and "2", respectively. At this time, the adjacent pixel (c2, r4) is included in the pixel area different from that of the pixel of interest, and therefore, the pixel of interest (c2, r3) is detected as an edge pixel of interest. Hereinafter, a pixel of the pixels adjacent to the pixel of interest from above, below, left, and right, which is included in another pixel area different from that of the pixel of interest, is described as a "comparison target pixel".

Returning to FIG. 15 again, at S1503, the type determination unit 124 compares the length of consecutive pixels value in the comparison target pixel and the first threshold. In FIG. 18B, a specific example of the length of consecutive pixels data acquired at S1501 is shown. As shown in FIG. 18B, the length of consecutive pixels value of the comparison target pixel (c2, r4) in the above-described specific example is "31". The first threshold that is compared with the length of consecutive pixels value may take various values and the first threshold in the present embodiment is set to "16". In the case of FIG. 18B, the results of the comparison between the length of consecutive pixels value "31" and the first threshold "16" are that the length of consecutive pixels value>the first threshold, and therefore, "NO" is determined in the determination processing at S1503.

In the case where the length of consecutive pixels value is smaller than or equal to the first threshold (S1503: YES), the processing advances to S1505 and the edge pixel of interest is determined to be a character line edge pixel. On the other hand, in the case where the length of consecutive pixels value is larger than the first threshold (S1503: NO), the processing advances to S1504.

At S1504, the type determination unit 124 counts the length of consecutive pixels in the second direction perpendicular to the first direction this time. At this time, the type determination unit 124 counts the length of consecutive pixels including the comparison target pixel and having a length of consecutive pixels value larger than the first threshold in the second direction. To explain specifically with reference to FIG. 18B, the pixel group including the comparison target pixel (c2, r4) and having a length of consecutive pixels value larger than the first threshold "16" is (c2, r4) and (c2, r5) having the length of consecutive pixels value "31". That is, in FIG. 18B, it is possible for the type determination unit 124 to acquire "2" as the count value in the second direction.

At S1505, the type determination unit 124 compares the count value in the second direction and the second threshold. As shown in FIG. 18B, the count value in the second direction is "2". The second threshold may take various values and the second threshold in the present embodiment is set to "16". In the case of FIG. 18B, the results of the comparison between the count value "2" in the second direction and the second threshold "16" are that the count value in the second direction the second threshold, and therefore, "YES" is determined at S1505.

In the case where the count value in the second direction is smaller than or equal to the second threshold (S1505: YES), the processing advances to step 1506 and the edge pixel of interest is determined to be a character line edge pixel. On the other hand, in the case where the count value in the second direction exceeds the second threshold (S1505: NO), the processing advances to S1507 and the edge pixel of interest is determined to be a solid edge pixel.

At S1506, the type determination unit 124 outputs a flag signal "1" to the edge pixel of interest determined to be a character line edge pixel. Similarly, at S1507, the type determination unit 124 outputs a flag signal "2" to the edge pixel of interest determined to be a solid edge pixel.

At S1508, whether or not the edge pixel type determination has been completed for all the pixels is determined. In the case where the edge pixel type determination has been completed for all the pixels (S1508: YES), the processing by this flowchart is terminated. In the case where the edge pixel type determination has not been completed for all the pixels (S1508: NO), the processing returns to S1502 again and the edge pixel type determination (S1502 to S1508) is repeated. As described above, by performing the acquisition of length of consecutive pixels data (S1501) and the edge pixel type determination (S1502 to S1508), it is possible for the pixel attribute determination unit 120 of the present embodiment to acquire the edge pixel type determination results shown in FIG. 18C.

Further, in the edge pixel type determination in the present embodiment, there is a case where a plurality of comparison target pixels exists for one pixel of interest, such as a case where the pixel of interest is the pixel (c3, r3). In this case, the type determination unit 124 temporarily performs the edge pixel type determination for each of the plurality of comparison target pixels. Then, the type determination unit 124 selects determination results from a plurality of edge pixel type determination results. As in the first embodiment, by setting selection priority of edge pixel type determination results as "character line edge pixel>solid edge pixel", it is possible to preferentially select the character line edge pixel. Alternatively, it may also be possible to preferentially select the edge pixel type determination results using an adjacent pixel to which high priority is set, for example, such as "rightward direction>leftward direction>upward direction>downward direction". Further alternatively, it may also be possible to select the edge pixel type larger in number by comparing the number of adjacent pixels determined to be a character line edge pixel and the number of adjacent pixels determined to be a solid edge pixel for the edge pixel of interest.

As explained above, in the edge pixel type determination of the present embodiment, the edge pixel determination and the edge pixel type determination are performed only in one predetermined direction (for example, rightward direction). Because of this, it is not necessary to perform the processing to count the number of continuous pixels in all the specified directions (for example, rightward direction, leftward direction, upward direction, and downward direction) and the processing to integrate edge pixel type determination results as in the first embodiment, and therefore, it is possible to further suppress the consumption amount of computer resource.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the image processing apparatus of the present invention, the effect is obtained that it is possible to implement an edge type determination method that consumes a small amount of computer resource.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-038707, filed Mar. 1, 2017, which is hereby incorporated by reference wherein in its entirety.

What is claimed is:

1. An image processing apparatus comprising:
a memory storing instructions; and
a processor configured to implement the instructions and execute a plurality of tasks, including:
an edge determination task that detects an edge pixel to which a white pixel and a black pixel are adjacent in a first direction in an image in which each pixel is represented as a white pixel or a black pixel;
a first detection task that detects a number of consecutive pixels from the edge pixel in the first direction in the image;
a second detection task that detects a number of consecutive pixels whose number of consecutive pixels in the first direction is larger than a first threshold in a second direction perpendicular to the first direction in the image; and
a type determination task that determines a type of the edge pixel based on detection results by the first detection task and detection results by the second detection task.

2. The image processing apparatus according to claim 1, wherein:
the type determination task determines, in a case where the number of consecutive pixels detected by the first detection task is larger than the first threshold and the number of consecutive pixels detected by the second detection task is smaller than or equal to a second threshold for pixels adjacent to an edge pixel of interest, the edge pixel of interest to be a character line edge pixel.

3. The image processing apparatus according to claim 1, wherein the type determination task determines:
in a case where the number of consecutive pixels in the first direction is smaller than or equal to the first threshold, the type of the edge pixel to be a character line edge pixel adjacent to a character line area;
in a case where the number of consecutive pixels in the first direction is larger than the first threshold and the number of consecutive pixels in the second direction is smaller than or equal to a second threshold, the type of the edge pixel to be the character line edge pixel; and
in a case where the number of consecutive pixels in the first direction is larger than the first threshold and the number of consecutive pixels in the second direction is larger than the second threshold, the type of the edge pixel to be a solid edge pixel adjacent to a solid area.

4. The image processing apparatus according to claim 3, wherein the plurality of tasks include:
a line width correction task that increases or decreases a gradation value of the edge pixel in a case where the type of the edge pixel is determined to be a character line edge pixel.

5. The image processing apparatus according to claim 3, wherein the plurality of tasks include:
a density unevenness correction task that decreases gradation values of a predetermined number of consecutive pixels from the edge pixel in a pixel area of pixels having a same pixel value as the solid edge pixel in a case where the type of the edge pixel is determined to be the solid edge pixel.

6. The image processing apparatus according to claim 5, wherein:
the first detection task counts a number of consecutive pixels in the pixel area, and
the number of consecutive pixels in the first direction is a count value obtained by the first detection task counting a number of consecutive pixels from an edge pixel to the next edge pixel.

7. The image processing apparatus according to claim 1, wherein:
the edge determination task determines a gradation value of a pixel of interest, while sequentially selecting pixels making up the image in a predetermined direction, and detects, in a case where the gradation value changes, the pixel of interest as the edge pixel.

8. The image processing apparatus according to claim 7, wherein:
the plurality of tasks include a count task that counts a number of consecutive pixels in the pixel area in a plurality of directions, and
the type determination task integrates a plurality of determination results obtained in a case where each of the plurality of directions is taken to be the first direction and determines the integrated determination results to be the type of the edge pixel.

9. The image processing apparatus according to claim 8, wherein:
the type determination task determines determination results selected from the plurality of determination results to be the type of the edge pixel in a case where the plurality of determination results is different from one another.

10. The image processing apparatus according to claim 1, the plurality of tasks include:
an acquisition task that acquires the number of consecutive pixels in the first direction by performing pattern matching between the image and a plurality of pixel patterns determined in advance.

11. The image processing apparatus according to claim 10, the plurality of tasks include:
a selection task that selects, in a case where at least one adjacent pixel in a group of pixels adjacent to a pixel of interest from above, below, left, and right is included in another pixel area different from the pixel area of the pixel of interest, the pixel of interest as an edge pixel of interest that is a target for which the type of the edge pixel is determined.

12. The image processing apparatus according to claim 1, wherein:
the plurality tasks include a classification task that converts an input multivalued image into an image in which each pixel is represented as a white pixel or a black pixel based on a gradation value and to classify the image into two or more pixel areas,
the classification task classifies pixels making up the multivalued image data into two pixel areas:
a pixel area in which the gradation value is smaller than or equal to a predetermined threshold; and
a pixel area in which the gradation value is larger than the predetermined threshold.

13. An image processing method comprising:
an edge determination step of detecting an edge pixel to which a white pixel and a black pixel are adjacent in a first direction in an image in which each pixel is represented as a white pixel or a black pixel;
a first detection step of detecting a number of consecutive pixels from the edge pixel in the first direction in the image;
a second detection step of detecting a number of consecutive pixels whose number of consecutive pixels in the first direction is larger than a first threshold in a second direction perpendicular to the first direction in the image; and
a type determination step of determining a type of the edge pixel based on detection results in the first detection step and detection results in the second detection step.

14. The image processing method according to claim 13, wherein:
the type determination step determines, in a case where the number of consecutive pixels detected in the first detection step is larger than the first threshold and the number of consecutive pixels detected in the second detection step is smaller than or equal to a second threshold for pixels adjacent to an edge pixel of interest, the edge pixel of interest to be a character line edge pixel.

15. The image processing method according to claim 13, wherein the type determination step determines:
in a case where the number of consecutive pixels in the first direction is smaller than or equal to the first threshold, the type of the edge pixel to be a character line edge pixel adjacent to a character line area;
in a case where the number of consecutive pixels in the first direction is larger than the first threshold and the number of consecutive pixels in the second direction is smaller than or equal to a second threshold, the type of the edge pixel to be the character line edge pixel; and
in a case where the number of consecutive pixels in the first direction is larger than the first threshold and the number of consecutive pixels in the second direction is larger than the second threshold, the type of the edge pixel to be a solid edge pixel adjacent to a solid area.

16. The image processing method according to claim 15, further comprising:
a line width correction step of increasing or decreasing a gradation value of the edge pixel in a case where the type of the edge pixel is determined to be a character line edge pixel.

17. The image processing method according to claim 15, further comprising:
a density unevenness correction step of decreasing gradation values of a predetermined number of consecutive pixels from the edge pixel in a pixel area of pixels having a same pixel value as the solid edge pixel in a case where the type of the edge pixel is determined to be the solid edge pixel.

18. The image processing method according to claim 17, wherein:
the first detection step counts a number of consecutive pixels in the pixel area, and
the number of consecutive pixels in the first direction is a count value obtained in the first detecting step counting a number of consecutive pixels from an edge pixel to the next edge pixel.

19. The image processing method according to claim 13, wherein:
the edge determination step determines a gradation value of a pixel of interest, while sequentially selecting pixels making up the image in a predetermined direction, and detects, in a case where the gradation value changes, the pixel of interest as the edge pixel.

20. A non-transitory computer readable storage medium storing a program executable by a computer to perform an image processing method comprising the steps of:
an edge determination step of detecting an edge pixel to which a white pixel and a black pixel are adjacent in a first direction in an image in which each pixel is represented as a white pixel or a black pixel;
a first detection step of detecting a number of consecutive pixels from the edge pixel in the first direction in the image;
a second detection step of detecting a number of consecutive pixels whose number of consecutive pixels in the first direction is larger than a first threshold in a second direction perpendicular to the first direction in the image; and
a type determination step of determining a type of the edge pixel based on detection results in the first detection step and detection results in the second detection step.

* * * * *